United States Patent
Ueno et al.

(10) Patent No.: US 9,205,822 B2
(45) Date of Patent: Dec. 8, 2015

(54) PRESSURE REGULATOR AND HYDRAULIC BRAKE SYSTEM EQUIPPED WITH THE PRESSURE REGULATOR

(75) Inventors: Hiroshi Ueno, Toyota (JP); Kiyoyuki Uchida, Konan (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/394,622

(22) PCT Filed: May 25, 2012

(86) PCT No.: PCT/JP2012/063492
§ 371 (c)(1),
(2), (4) Date: Oct. 15, 2014

(87) PCT Pub. No.: WO2013/175628
PCT Pub. Date: Nov. 28, 2013

(65) Prior Publication Data
US 2015/0069828 A1    Mar. 12, 2015

(51) Int. Cl.
*B60T 13/58* (2006.01)
*B60T 8/17* (2006.01)
(Continued)

(52) U.S. Cl.
CPC ............... *B60T 13/58* (2013.01); *B60T 7/042* (2013.01); *B60T 8/17* (2013.01); *B60T 8/4077* (2013.01); *B60T 13/12* (2013.01); *B60T 13/146* (2013.01);
(Continued)

(58) Field of Classification Search
CPC .......... Y10T 137/0396; Y10T 137/777; F15B 13/0401; F15B 13/0402; F15B 13/0433; F15B 2211/575; G05D 16/166; F16K 31/124; F16K 31/363; B60T 13/146; B60T 13/58; B60T 13/3665
See application file for complete search history.

(56) References Cited

U.S. PATENT DOCUMENTS

| 2008/0000534 A1* | 1/2008 | Tabor | F16K 11/07 137/625.66 |
| 2015/0015059 A1* | 1/2015 | Kamiya | B60T 7/042 303/6.01 |

FOREIGN PATENT DOCUMENTS

| JP | 2011-156998 | 8/2011 |
| JP | 2011-226541 | 11/2011 |

OTHER PUBLICATIONS

International Search Report issued Aug. 28, 2012 in PCT/JP2012/063492 filed May 25, 2012.

*Primary Examiner* — Vishal Sahni
(74) *Attorney, Agent, or Firm* — Oblon, McClelland, Maier & Neustadt, L.L.P.

(57) ABSTRACT

A pressure regulator, including a housing; a piston axially movably disposed in the housing; a high-pressure chamber; a low-pressure chamber; a regulated-pressure chamber whose pressure biases the piston in a first direction in an axial direction of the housing; a first pilot chamber whose pressure biases the piston in a second direction opposite to the first direction; a second pilot chamber whose pressure biases the piston in the second direction; and a valve mechanism configured such that, by a movement of the piston in the second direction, communication between the regulated-pressure chamber and the high-pressure chamber is permitted while communication between the regulated-pressure chamber and the low-pressure chamber is shut off and such that, by a movement of the piston in the first direction, the communication between the regulated-pressure chamber and the high-pressure chamber is shut off while the communication between the regulated-pressure chamber and the low-pressure chamber is permitted.

10 Claims, 7 Drawing Sheets

(51) Int. Cl.
- B60T 13/12 (2006.01)
- B60T 15/36 (2006.01)
- F16K 31/124 (2006.01)
- B60T 7/04 (2006.01)
- B60T 13/14 (2006.01)
- B60T 8/40 (2006.01)
- G05D 16/16 (2006.01)

(52) U.S. Cl.
CPC ............... B60T 15/36 (2013.01); F16K 31/124 (2013.01); G05D 16/166 (2013.01); Y10T 137/7762 (2015.04)

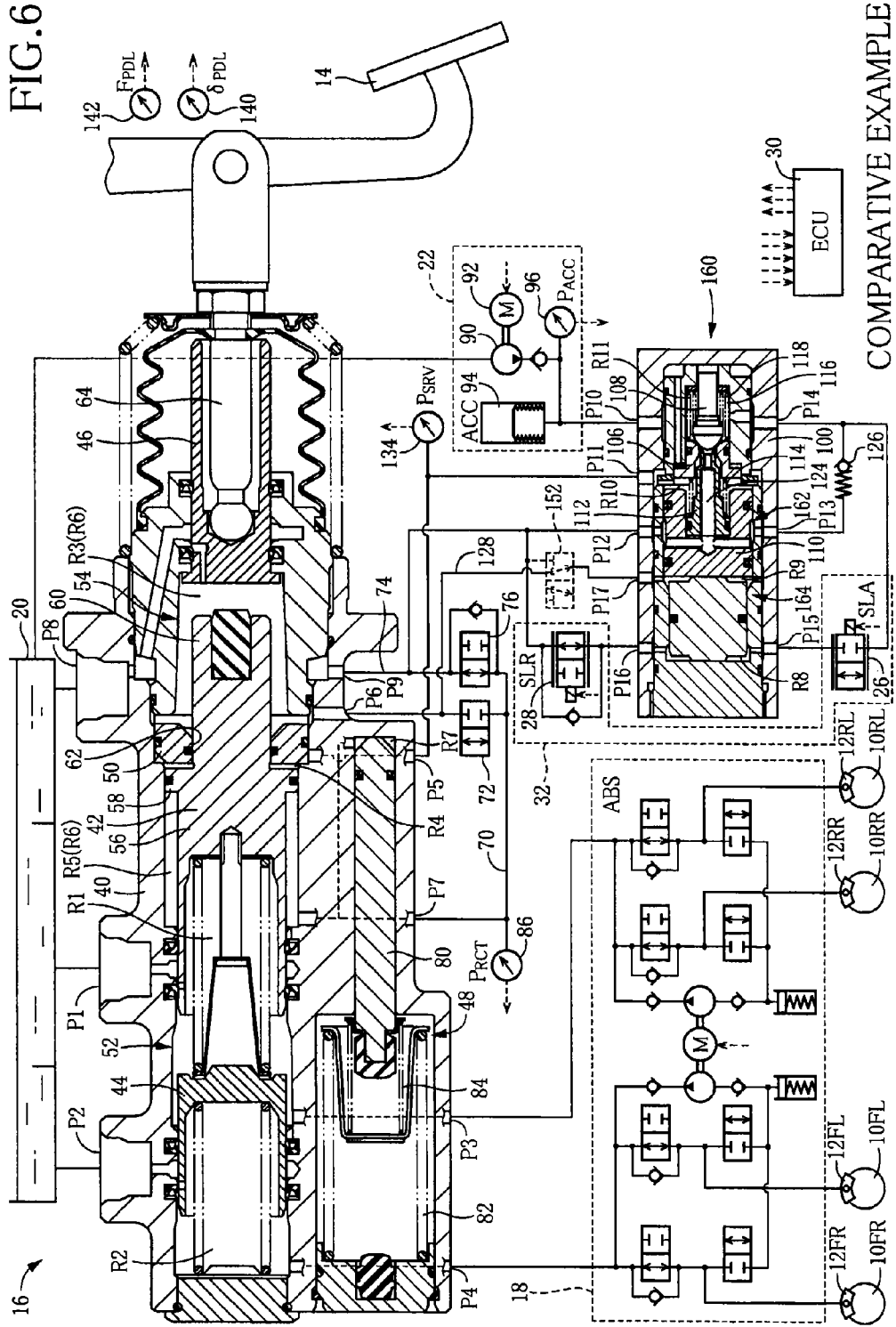

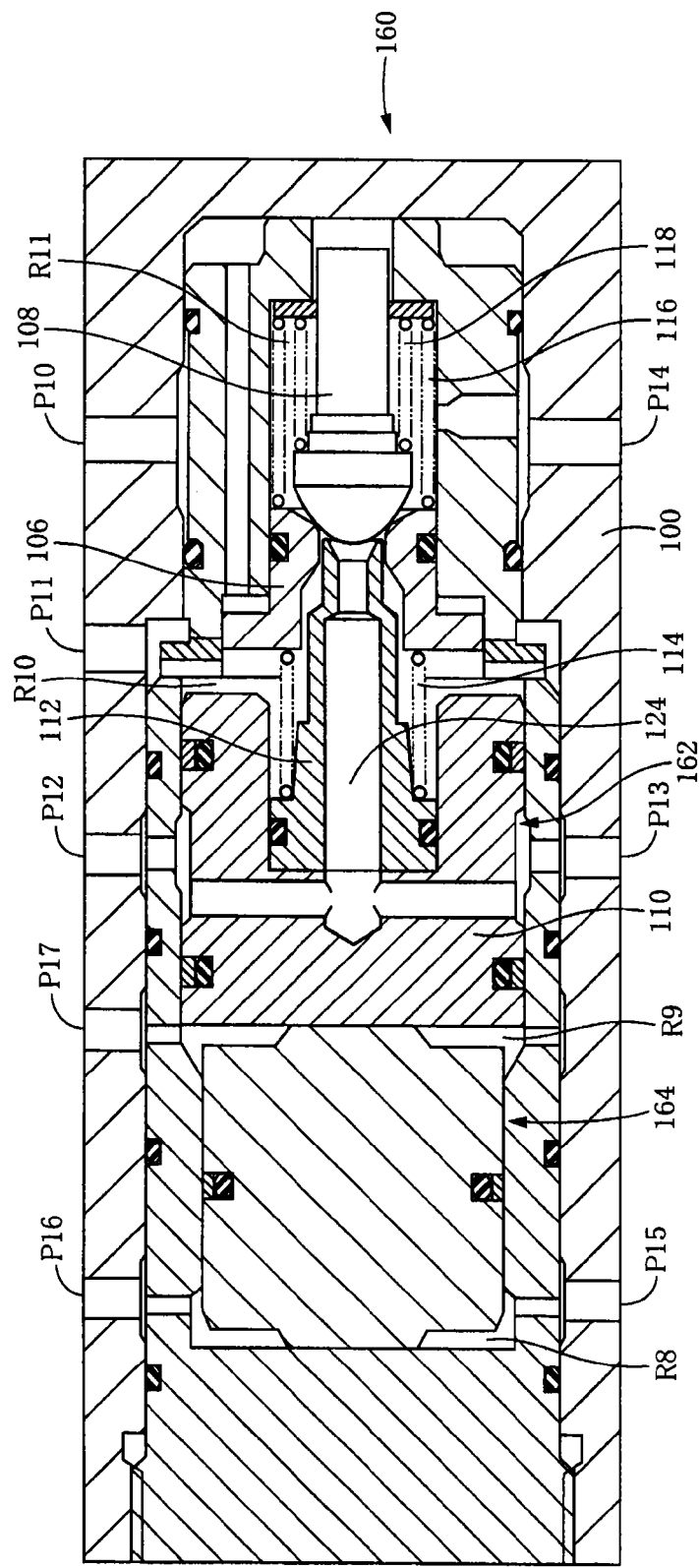
FIG.7 COMPARATIVE EXAMPLE

PRESSURE REGULATOR AND HYDRAULIC BRAKE SYSTEM EQUIPPED WITH THE PRESSURE REGULATOR

TECHNICAL FIELD

The present invention relates to a pressure regulator configured to regulate a pressure of a working fluid supplied from a high-pressure source and to supply the working fluid whose pressure is regulated. The invention further relates to a hydraulic brake system equipped with the pressure regulator.

BACKGROUND ART

As a hydraulic brake system for a vehicle, there is known a system equipped with a pressure regulator (the so-called regulator) as disclosed in the following Patent Literature. The pressure regulator provided in the system has a function of regulating a pressure of a working fluid supplied from a high-pressure-source device, as a high-pressure source, constituted by a pump, and so on, to a pressure in accordance with a pilot pressure introduced into the pressure regulator and supplying the working fluid whose pressure is regulated. More specifically, the pressure regulator has two pistons disposed in series for activating a valve mechanism. In the pressure regulator, there are formed a first pilot chamber on one side of one of the two pistons and a second pilot chamber on another side of the one of the two pistons such that the second pilot chamber is interposed between the two pistons. A pressure of the working fluid to be supplied from the master cylinder device to the brake device provided for each wheel is introduced into the first pilot chamber as a first pilot pressure. A pressure of the working fluid which is supplied from the high-pressure-source device and whose pressure is adjusted by a pressure adjuster constituted by a pressure-increase linear valve and a pressure-decrease linear valve is introduced into the second pilot chamber as a second pilot pressure. According to the structure, the pressure regulator is configured to regulate the pressure of the working fluid supplied from the high-pressure-source device to a pressure in accordance with one of the two pilot pressures and to supply the pressure-regulated working fluid.

CITATION LIST

Patent Literature

Patent Literature 1: JP-A-2011-226541 FIGS. 1 and 2

SUMMARY OF INVENTION

Technical Problem

In the pressure regulator disclosed in the Patent Literature 1, the two pilot chambers are disposed in series with the one of the two pistons interposed therebetween. Accordingly, a variation in the pilot pressure of one of the two pilot chambers tends to influence the pilot pressure of the other of the two pilot chambers. When such a pressure regulator is provided in a hydraulic brake system, there may be a risk of impairing a good control of the braking force and a good braking operation feeling in the hydraulic brake system. Accordingly, improvements from such a viewpoint lead to enhancement of the utility of the pressure regulator and accordingly the utility of the hydraulic brake system equipped with the pressure regulator. The present invention has been made in view of such situations. It is therefore an object of the invention to provide a pressure regulator having a high degree of utility and a hydraulic brake system having a high degree of utility.

Solution to Problem

To solve the problem described above, the invention provides a pressure regulator having a piston for activating a valve mechanism, a first pilot chamber defined by a part of the piston, and a second pilot chamber defined by another part of the piston. The pressure regulator is configured such that pressures in the respective two pilot chambers bias the piston in the same direction. The hydraulic brake system according to the invention has the thus constructed pressure regulator and is configured such that a working fluid whose pressure is adjusted by a pressure adjuster is introduced into one of the two pilot chambers of the pressure regulator while a working fluid having a pressure in accordance with a brake operation force or a working fluid to be supplied from the master cylinder device to the brake device is introduced into the other of the two pilot chambers.

Advantageous Effects of Invention

In the pressure regulator according to the present invention, in short, the two pilot chambers are disposed in parallel to each other with respect to the one piston. According to the present pressure regulator, it is possible to comparatively reduce a pressure variation in the working fluid introduced into the other of the two pilot chambers due to a pressure variation in the working fluid introduced into the one of the two pilot chambers. Further, according to the hydraulic brake system equipped with the pressure regulator, a pressure variation in one of the working fluid whose pressure is adjusted by the pressure adjuster; and the working fluid having a pressure in accordance with the brake operation force or the working fluid to be supplied from the master cylinder device to the brake device is less likely to influence a pressure variation in the other. Therefore, the hydraulic brake system ensures a comparatively good control of the braking force and a comparatively good braking operation feeling.

FORMS OF INVENTION

There will be exemplified and explained various forms of an invention that is considered claimable. (The invention will be hereinafter referred to as "claimable invention" where appropriate). Each of the forms is numbered like the appended claims and depends from the other form or forms, where appropriate. This is for easier understanding of the claimable invention, and it is to be understood that combinations of constituent elements that constitute the invention are not limited to those described in the following forms. That is, it is to be understood that the claimable invention shall be construed in the light of the following description of various forms and embodiments. It is to be further understood that, as long as the claimable invention is construed in this way, any form in which one or more constituent elements is/are added to or deleted from any one of the following forms may be considered as one form of the claimable invention.

In the following forms, the form (1) corresponds to claim 1. The form (2) corresponds to claim 2. The form (4) corresponds to claim 3. The form (11) corresponds to claim 4. The form (15) corresponds to claim 5. The form (17) corresponds to claim 6. The form (18) corresponds to claim 7. The form (19) corresponds to claim 8. The form (21) corresponds to claim 9. The form (20) corresponds to claim 10.

<Forms Relating to Pressure Regulator>

There will be explained below some forms relating to the pressure regulator according to the claimable invention.

(1) A pressure regulator configured to regulate a pressure of a working fluid supplied from a high-pressure source and to supply the working fluid whose pressure is regulated, comprising:
- a housing;
- a piston disposed in the housing so as to be movable in an axial direction of the housing;
- a high-pressure chamber that communicates with the high-pressure source;
- a low-pressure chamber that communicates with a low-pressure source;
- a regulated-pressure chamber in which a working fluid to be supplied from the pressure regulator is accommodated, the regulated-pressure chamber being configured such that a pressure of the accommodated working fluid acts on the piston, whereby the piston is biased in a first direction in the axial direction;
- a first pilot chamber defined by a part of the piston and the housing and configured such that a working fluid is introduced thereinto and such that a pressure of the introduced working fluid acts on the piston, whereby the piston is biased in a second direction opposite to the first direction;
- a second pilot chamber defined by another part of the piston and the housing and configured such that a working fluid is introduced thereinto and such that a pressure of the introduced working fluid acts on the piston, whereby the piston is biased in the second direction; and
- a valve mechanism configured such that, by a movement of the piston in the first second direction, communication between the regulated-pressure chamber and the high-pressure chamber is permitted while communication between the regulated-pressure chamber and the low-pressure chamber is shut off and such that, by a movement of the piston in the first direction, the communication between the regulated-pressure chamber and the high-pressure chamber is shut off while the communication between the regulated-pressure chamber and the low-pressure chamber is permitted.

In the pressure regulator according to this form, the piston is configured to activate the valve mechanism. Where a pressure of the working fluid introduced into the first pilot chamber is referred to as "first pilot pressure" and a pressure of the working fluid introduced into the second pilot chamber is referred to as "second pilot pressure", the first pilot pressure and the second pilot pressure act on the piston so as to bias the piston in the same direction. In other words, the first pilot chamber and the second pilot chamber are disposed in parallel to each other with respect to the one piston. Accordingly, the influence of a variation in one of the first pilot pressure and the second pilot pressure on the other of the first pilot pressure and the second pilot pressure can be made relatively small. That is, a pressure variation in the working fluid introduced into one of the first pilot chamber and the second pilot chamber is less likely to influence a pressure variation in the working fluid introduced into the other of the first pilot chamber and the second pilot chamber. Therefore, in the hydraulic brake system in which the pressure regulator according to this form is provided and in which the working fluid at two locations in the system is introduced into the first pilot chamber and the second pilot chamber, a pressure variation in the working fluid at one of the two locations does not largely influence a pressure variation in the working fluid at the other of the two locations. Accordingly, the system of this form enjoys an advantage of being capable of executing a control of the braking force relatively excellently and an advantage of ensuring a relatively good braking operation feeling.

The "valve mechanism" in this form may have the so-called spool valve structure or may by the so-called poppet valve structure. In either case, according to the valve mechanism of this form, a movement direction of the piston is determined, in other words, a position of the piston when moved in the movement direction is determined based on a relationship between: a biasing force by a pressure in the regulated-pressure chamber; and a sum of a biasing force by the first pilot pressure and a biasing force by the second pilot pressure. Further, depending on the direction or the position, there is selectively effectuated one of: a state in which communication between the regulated-pressure chamber and the high-pressure chamber is permitted while communication between the regulated-pressure chamber and the low-pressure chamber is shut off (hereinafter referred to as "high-pressure-communication and low-pressure-shutoff state" where appropriate); and a state in which the communication between the regulated-pressure chamber and the high-pressure chamber is shut off while the communication between the regulated-pressure chamber and the low-pressure chamber is permitted (hereinafter referred to as "high-pressure-shutoff and low-pressure-communication state" where appropriate).

(2) The pressure regulator according to the form (1), further comprising a pilot-chamber opposing chamber defined by still another part of the piston and the housing and configured such that, when a working fluid having a pressure that is the same as a pressure of the working fluid introduced into the second pilot chamber is introduced into the pilot-chamber opposing chamber, the pressure of the working fluid introduced into the pilot-chamber opposing chamber acts on the piston to thereby bias the piston in the first direction and the biasing with respect to the piston by the pressure of the working fluid in the pilot-chamber opposing chamber in the first direction cancels the biasing with respect to the piston by the pressure of the working fluid in the second pilot chamber in the second direction.

Here, the pressure of the working fluid introduced into the pilot-chamber opposing chamber is referred to as "opposing pressure". In the pressure regulator of this form, the biasing force by the second pilot pressure that acts on the piston and the biasing force by the opposing pressure that acts on the piston are balanced by making the second pilot pressure and the opposing pressure identical to each other, thereby ensuring accurate pressure regulation by the first pilot pressure.

(3) The pressure regulator according to the form (1) or (2),
- wherein the piston has a main body portion having a cylindrical shape and a flange portion formed around an outer circumference of the main body portion, and
- wherein the first pilot chamber is located on a first-direction side of the main body portion, and the second pilot chamber is formed around the outer circumference of the main body portion and is located on a first-direction side of the flange portion.

(4) The pressure regulator according to the form (3), further comprising a pilot-chamber opposing chamber defined by still another part of the piston and the housing and configured such that, when the working fluid having a pressure that is the same as a pressure of the working fluid introduced into the second pilot chamber is introduced into the pilot-chamber opposing chamber, the pressure of the working fluid introduced into the pilot-chamber opposing chamber acts on the piston to thereby bias the piston in the first direction and the biasing with respect to the piston by the pressure of the working fluid in the pilot-chamber opposing chamber in the first direction cancels the biasing with respect to the piston by the pressure of the working fluid in the second pilot chamber in the second direction, wherein the pilot-chamber opposing chamber is formed around the outer circumference of the main body portion of the piston and is located on a second-direction side of the flange portion, such that the pilot-chamber opposing chamber is opposed to the second pilot chamber with the flange portion interposed therebetween.

In the above two forms, there are added limitation as to the shape of the piston and limitation as to positions of the first pilot chamber, the second pilot chamber, and the pilot-chamber opposing chamber in accordance with the shape of the piston. According to the above two forms, it is possible to construct the pressure regulator in which the first pilot chamber, the second pilot chamber, and the pilot-chamber opposing chamber are appropriately defined.

<Forms Relating to Hydraulic Brake System>

There will be explained below some forms relating to the hydraulic brake system according to the claimable invention equipped with the pressure regulator according to the claimable invention.

(11) A hydraulic brake system for a vehicle, comprising:
a brake operation member on which a driver performs a braking operation;
a brake device provided for a wheel of the vehicle so as to generate a braking force;
a high-pressure-source device as the high-pressure source;
the pressure regulator defined in any one of the forms (1)-(4) configured to regulate the pressure of the working fluid supplied from the high-pressure-source device and to supply the working fluid whose pressure is regulated;
a master cylinder device to which the brake operation member is connected and into which the working fluid supplied from the pressure regulator is introduced, the master cylinder device being configured to pressurize a working fluid depending on a pressure of the introduced working fluid and to supply the pressurized working fluid to the brake device; and
a pressure adjuster configured to adjust the working fluid supplied from the high-pressure-source device to an arbitrary pressure,
wherein the working fluid whose pressure is adjusted by the pressure adjuster is introduced into one of the first pilot chamber and the second pilot chamber of the pressure regulator while a working fluid having a pressure in accordance with a brake operation force applied to the brake operation member or a working fluid supplied form the master cylinder device to the brake device is introduced into the other of the first pilot chamber and the second pilot chamber.

The hydraulic brake system according to this form is configured to generate a braking force in dependence on the pressure of the working fluid supplied from the pressure regulator (hereinafter referred to as "supply pressure of the pressure regulator" where appropriate). The master cylinder device may be configured such that a pressure of the working fluid to be supplied therefrom to the brake device (hereinafter referred to as "master pressure" where appropriate) depends only on the supply pressure of the pressure regulator or may be configured such that the master pressure depends on both of the brake operation force and the supply pressure of the pressure regulator. Where the present hydraulic brake system is installed on vehicles equipped with a regenerative brake system, such as hybrid vehicles, the braking force that should be generated by the present hydraulic brake system does not necessarily have a magnitude in accordance with the braking operation. In view of this, it is preferable to pressurize the working fluid to be supplied to the brake device, such that the master pressure that is the pressure of the working fluid to be supplied to the brake device depends only on the supply pressure of the pressure regulator.

In the hydraulic brake system according to this form, the pressure adjusted by the pressure adjuster (hereinafter referred to as "adjusted pressure" where appropriate) is introduced as one of the two pilot pressures while a pressure in accordance with the brake operation force (hereinafter referred to as "operation-force-dependent pressure" where appropriate) or the master pressure is introduced as the other of the two pilot pressures. In the present system, therefore, the supply pressure of the pressure regulator can be regulated in the pressure regulator by both of the two pilot pressures, more specifically, by a force that is a sum of forces generated by the respective two pilot pressures. The present system may be configured such that, in place of or in addition to the regulation of the supply pressure of the pressure regulator by both of the two pilot pressures, the supply pressure of the pressure regulator is regulated only by the adjusted pressure by providing a mechanism for prohibiting introduction of the operation-force-dependent pressure or the master pressure, for instance. Further, by preventing the adjusted pressure from being increased or in an instance where the adjusted pressure cannot be increased, the supply pressure of the pressure regulator may be regulated only by the operation-force-dependent pressure or only by the master pressure. That is, the pressure regulator can be operated in various pressure regulating modes.

Where the system is configured such that the supply pressure of the pressure regulator is regulated only by the operation-force-dependent pressure or only by the master pressure, it is possible to generate, in the event of failure or the like, the braking force that depends on the supply pressure of the pressure regulator as long as the high-pressure-source device can operate appropriately or as long as the working fluid having an appropriate pressure remains in the high-pressure-source device. The thus configured hydraulic brake system is excellent in terms of failsafe.

(12) The hydraulic brake system according to the form (11),
wherein the pressure adjuster includes: an electromagnetic pressure-increase linear valve disposed between the high-pressure-source device and the one of the first pilot chamber and the second pilot chamber and configured to increase a pressure of the working fluid in the one of the first pilot chamber and the second pilot chamber; and an electromagnetic pressure-decrease linear valve disposed between the low-pressure source and the one of the first pilot chamber and the second pilot chamber and configured to decrease the pressure of the working fluid in the one of the first pilot chamber and the second pilot chamber, and
wherein the pressure adjuster is configured to adjust the pressure of the working fluid in the one of the first pilot chamber and the second pilot chamber to the arbitrary pressure.

In this form, there is added limitation as to a concrete structure of the pressure adjuster. Owing to the pressure-increase linear valve and the pressure-decrease linear valve, it is possible to introduce, into the one of the two pilot chambers, the working fluid having a pressure different from a pressure that depends only on the brake operation amount and the brake operation force. Accordingly, the system of this form is suitable for vehicles equipped with the regenerative brake system described above.

(13) The hydraulic brake system according to the form (11) or (12), comprising a pilot-pressure-introduction switching mechanism configured to switch between: introduction, to the other of the first pilot chamber and the second pilot chamber, of the working fluid having the pressure in accordance with the brake operation force or the working fluid to be supplied from the master cylinder device to the brake device; and prohibition of the introduction.

As explained above, the pressure regulator is configured to regulate the supply pressure of the pressure regulator by both of the two pilot pressures. In the system according to this form, it is possible to prohibit introduction of one of the two pilot pressures, namely, the operation-force-dependent pressure or the master pressure, as the pilot pressure. Therefore, the supply pressure of the pressure regulator can be appropriately controlled only by the adjusted pressure adjusted by the pressure adjuster.

(14) The hydraulic brake system according to any one of the forms (11)-(13), comprising an operation-mode switching mechanism configured to selectively effectuate one of two modes each as an operation mode of the master cylinder device (A) a pressurizing mode depending on a supply pressure of the pressure regulator in which the working fluid to be supplied from the master cylinder device to the brake device is pressurized to a pressure at which the brake device generates a braking force having a magnitude in accordance with the pressure of the working fluid supplied from the pressure regulator and introduced into the master cylinder device and (B) a pressurizing mode depending on the operation force and the supply pressure of the pressure regulator in which the working fluid to be supplied from the master cylinder device to the brake device is pressurized to a pressure at which the brake device generates a braking force that is a sum of: the braking force having a magnitude in accordance with the pressure of the working fluid supplied from the pressure regulator and introduced into the master cylinder device; and a braking force having a magnitude in accordance with the brake operation force applied to the brake operation member.

The system according to this form is configured to switch between: a mode in which the master pressure becomes equal to a pressure that depends only on the supply pressure of the pressure regulator; and a mode in which the master pressure becomes equal to a pressure that depends on both of the brake operation force and the supply pressure of the pressure regulator. The former mode has an advantage in that the system is suitable for vehicles equipped with the regenerative brake system as explained above. The latter mode has an advantage of being capable of generating a braking force larger than a braking force generated only by the brake operation force. The system of this form enjoys those two advantages. In the latter mode, where the supply pressure of the pressure regulator is not introduced, the braking force that depends only on the brake operation force, namely, the braking force having a magnitude in accordance with the brake operation force, is generated. In this instance, the latter mode may be regarded as the pressurizing mode depending on the operation force. In other words, the pressurizing mode depending on the operation force may be regarded as one form of the pressurizing mode depending on the operation force and the supply pressure of the pressure regulator. It is noted that the pressurizing mode depending on the operation force is effective in terms of failsafe when electric failure or the like occurs in the system.

(15) The hydraulic brake system according to the form (14),
wherein the master cylinder device has:
a housing; and
(a) a pressurizing piston disposed in the housing and having a main body portion and a flange portion that is formed around an outer circumference of the main body portion and (b) an input piston disposed in the housing so as to be located rearward of the pressurizing piston, the brake operation member being connected to a rear end of the input piston,
wherein the master cylinder device has: a pressurizing chamber which is formed forward of the pressurizing piston and in which the working fluid to be supplied to the brake device is pressurized; an inter-piston chamber formed between the main body portion of the pressurizing piston and the input piston; and an input chamber which is formed rearward of the flange portion of the pressurizing piston and into which the working fluid supplied from the pressure regulator is introduced, and
wherein the pressurizing mode depending on the supply pressure of the pressure regulator is effectuated by prohibiting transmission of the brake operation force from the input piston to the pressurizing piston via the working fluid in the inter-piston chamber while the pressurizing mode depending on the operation force and the supply pressure of the pressure regulator is effectuated by permitting the transmission of the brake operation force from the input piston to the pressurizing piston via the working fluid in the inter-piston chamber.

(16) The hydraulic brake system according to the form (15),
wherein the housing of the master cylinder device has a partition portion partitioning an interior of the housing into a front-side chamber and a rear-side chamber, the partition portion having an opening formed therethrough for permitting communication between the front-side chamber and the rear-side chamber,
wherein the pressurizing piston is disposed such that the flange portion thereof is located in the front-side chamber while the input piston is disposed in the rear-side chamber, and
wherein the input chamber is formed between the partition portion and the flange portion of the pressurizing piston while the inter-piston chamber is formed such that the main body portion of the pressurizing piston and the input piston face to each other with the inter-piston chamber interposed therebetween by utilizing the opening of the partition portion.

(17) The hydraulic brake system according to the form (15) or (16),
wherein the master cylinder device has an input-chamber opposing chamber formed forward of the flange portion of the pressurizing piston so as to be opposed to the input chamber with the flange portion interposed therebetween,
wherein a pressure receiving area of the pressurizing piston on which a pressure of a working fluid in the inter-piston chamber acts and a pressure receiving area of the pressurizing piston on which a pressure of a working fluid in the input-chamber opposing chamber acts are made equal to each other, and
wherein the operation-mode switching mechanism is configured to effectuate the pressurizing mode depending on the supply pressure of the pressure regulator by permitting communication between the inter-piston chamber and the input-chamber opposing chamber and by shutting off communication of the inter-piston chamber and the input-chamber opposing chamber with the low-pressure source and is configured to effectuate the pressurizing mode depending on the operation force and the supply pressure of the pressure regulator by shutting off the communication between the inter-piston chamber and the input-chamber opposing chamber and by permitting communication between the low-pressure source and the input-chamber opposing chamber.

In the above three forms, there is added limitation as to the structure of the master cylinder device for selectively effectuating one of the above-indicated two modes. For the limitation in the second form of the above three forms as to how the inter-piston chamber is formed, namely, the feature that "the main body portion of the pressurizing piston and the input piston face to each other utilizing the opening of the partition portion", the feature may be effectuated by the following structures, for instance: A) a structure in which the main body portion of the pressurizing piston extends into the rear-side chamber through the opening of the partition portion, and the rear end of the extended portion and the front end of the input piston face to each other; and B) a structure in which the main body portion of the pressurizing piston has a blind hole that is open on its rear side, and the input piston extends into the blind hole through the opening of the partition portion, whereby the inner bottom of the blind hole and the front end of the input piston face to each other.

(18) The hydraulic brake system according to the form (17), wherein the operation-mode switching mechanism has an inter-chamber communication passage for permitting the communication between the inter-piston chamber and the input-chamber opposing chamber, an inter-chamber-communication switching valve disposed in the inter-chamber communication passage and configured to switch between: the communication between the inter-piston chamber and the input-chamber opposing chamber by the inter-chamber communication passage; and shutting off of the communication therebetween, a low-pressure-source communication passage for permitting the communication between the input-chamber opposing chamber and the low-pressure source without passing through the inter-chamber-communication switching valve, and a low-pressure-source-communication switching valve disposed in the low-pressure-source communication passage and configured to switch between: the communication between the input-chamber opposing chamber and the low-pressure source; and shutting off of the communication therebetween, wherein the operation-mode switching mechanism is configured to effectuate the pressurizing mode depending on the supply pressure of the pressure regulator by permitting the communication between the inter-piston chamber and the input-chamber opposing chamber by means of the inter-chamber-communication switching valve and by shutting off the communication between the input-chamber opposing chamber and the low-pressure source by means of the low-pressure-source-communication switching valve, and wherein the operation-mode switching mechanism is configured to effectuate the pressurizing mode depending on the operation force and the supply pressure of the pressure regulator by shutting off the communication between the inter-piston chamber and the input-chamber opposing chamber by means of the inter-chamber-communication switching valve and by permitting the communication between the input-chamber opposing chamber and the low-pressure source by means of the low-pressure-source-communication switching valve.

In this form, there is added limitation as to a concrete structure of the operation-mode switching mechanism. Where the inter-chamber-communication switching valve is constituted by a normally closed electromagnetic open/close valve (configured to be closed in a non-energized state and to be open in an energized state) while the low-pressure-source-communication switching valve is constituted by a normally open electromagnetic open/close valve (configured to be open in a non-energized state and to be closed in an energized state), for instance, the above-indicated pressurizing mode depending on the operation force is effectuated in the event of electric failure. Accordingly, it is possible to construct a system advantageous in terms of failsafe.

(19) The hydraulic brake system according to the form (18), further comprising a pilot-pressure introduction passage provided on one side of the inter-chamber-communication switching valve nearer to the inter-piston chamber for permitting communication between the inter-piston chamber and the other of the first pilot chamber and the second pilot chamber of the pressure regulator, wherein the hydraulic brake system is configured such that the working fluid in the inter-piston chamber is introduced into the other of the first pilot chamber and the second pilot chamber as the working fluid having a pressure in accordance with the brake operation force applied to the brake operation member or in accordance with a pressure of the working fluid to be supplied from the master cylinder device to the brake device.

In this form, the operation-force-dependent pressure is introduced into the pressure regulator as one of the two pilot pressures. There is a high possibility that a variation in the operation-force-dependent pressure gives the driver an unnatural feeling in the braking operation. In this form, however, a variation in the operation-force-dependent pressure that arises from a variation in the adjusted pressure as the other of the two pilot pressures is comparatively small, thereby suppressing or reducing the unnatural feeling. In this respect, the variation in the adjusted pressure tends to occur upon switching of the operation mode and upon startup of the system. This form can sufficiently suppress or reduce the unnatural feeling upon switching of the operation mode and upon startup of the system.

(20) The hydraulic brake system according to the form (19), further comprising a pilot-pressure-introduction switching mechanism configured to switch between: introduction of the working fluid in the inter-piston chamber into the other of the first pilot chamber and the second pilot chamber of the pressure regulator; and prohibition of the introduction, wherein the pilot-pressure-introduction switching mechanism includes a pilot-pressure-introduction switching valve provided in the pilot-pressure introduction passage.

According to this form, it is possible to prohibit introduction of the operation-force-dependent pressure as the pilot pressure, whereby the supply pressure of the pressure regulator can be appropriately controlled only by the adjusted pressure. By prohibiting, in the pressurizing mode depending on the supply pressure of the pressure regulator explained above, introduction of the operation-force-dependent pressure as the pilot pressure, it is possible, in the mode, to appropriately control the braking force.

(21) The hydraulic brake system according to the form (19),
- wherein the piston of the pressure regulator has a main body portion having a cylindrical shape and a flange portion formed around an outer circumference of the main body portion,
- wherein the first pilot chamber is located on a first-direction side of the main body portion, and the second pilot chamber is formed around the outer circumference of the main body portion and is located on a first-direction side of the flange portion,
- wherein the pressure regulator has a pilot-chamber opposing chamber defined by still another part of the piston and the housing and configured such that, when the working fluid having a pressure that is the same as a pressure of the working fluid introduced into the second pilot chamber is introduced into the pilot-chamber opposing chamber, the pressure of the working fluid introduced into the pilot-chamber opposing chamber acts on the piston to thereby bias the piston in the first direction and the biasing with respect to the piston by the pressure of the working fluid in the pilot-chamber opposing chamber in the first direction cancels the biasing with respect to the piston by the pressure of the working fluid in the second pilot chamber in the second direction,
- wherein the pilot-chamber opposing chamber is formed around the outer circumference of the main body portion of the piston and is located on a second-direction side of the flange portion, such that the pilot-chamber opposing chamber is opposed to the second pilot chamber with the flange portion interposed therebetween, and
- wherein the hydraulic brake system has an inter-opposing-chamber communication passage provided on one side of the low-pressure-source-communication switching valve nearer to the input-chamber opposing chamber for permitting communication between the input-chamber opposing chamber and the pilot-chamber opposing chamber of the pressure regulator.

According to this form, the biasing force that acts on the piston by the operation-force-dependent pressure introduced as the pilot pressure is cancelled in the above-indicated pressurizing mode depending on the supply pressure of the pressure regulator. Accordingly, the supply pressure of the pressure regulator can be appropriately controlled in the mode only by the adjusted pressure. Further, according to this form, the cancellation of the biasing force can be effectuated without providing the pilot-pressure-introduction switching valve, enabling construction of the system advantageous in the cost.

BRIEF DESCRIPTION OF DRAWINGS

FIG. 6 is a view showing a hydraulic brake system according to a comparative example.

FIG. 7 is a view showing a pressure regulator according to the comparative example provided in the hydraulic brake system of the comparative example.

DESCRIPTION OF EMBODIMENTS

There will be explained in detail representative embodiments of the hydraulic brake system and the pressure regulator according to the claimable invention with reference to the drawings. There will be further explained a conventional hydraulic brake system and a conventional pressure regulator, as a comparative example, with reference to the drawings. It is to be understood that the claimable invention is not limited to the following embodiments, and the forms described in FORMS OF INVENTION, but may be embodied with various changes and modifications based on the knowledge of those skilled in the art. It is to be further understood that modified examples of the following embodiments may be provided through the use of technical matters explained in the forms described in FORMS OF INVENTION.

EMBODIMENTS

A. First Embodiment

Figure 1:
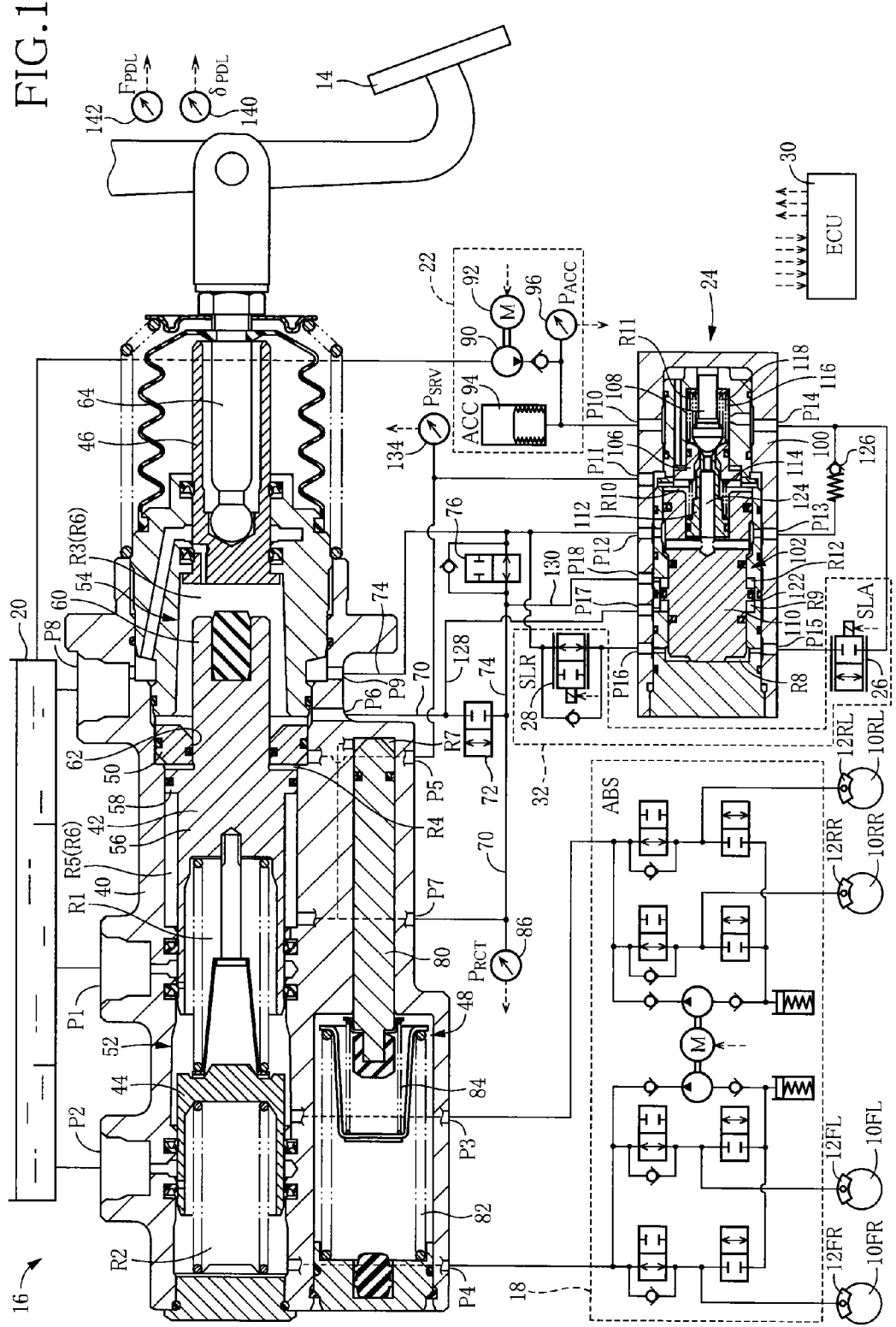
FIG. 1 is a view showing a hydraulic brake system according to a first embodiment.
Figure 2:
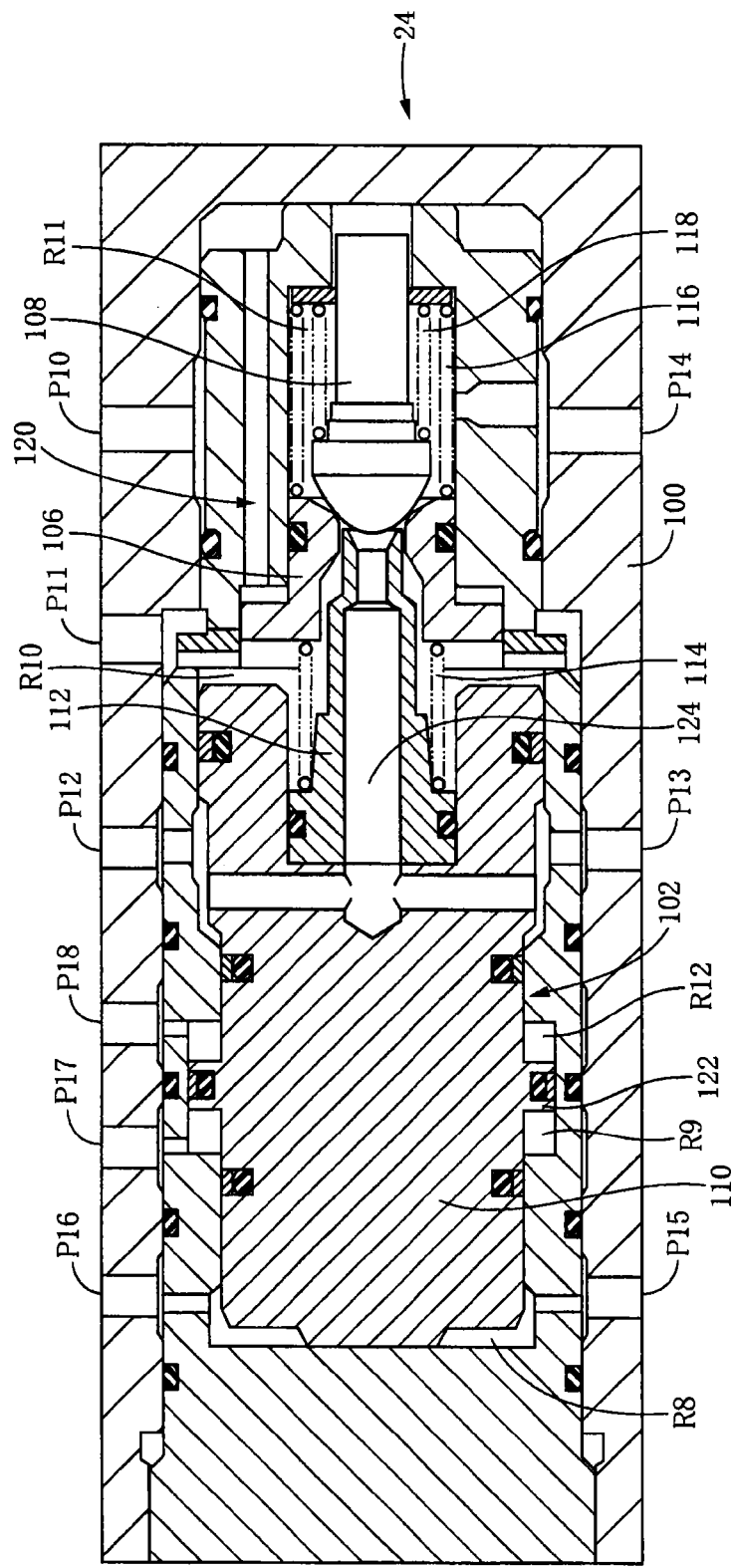
FIG. 2 is a view showing a pressure regulator according to the first embodiment provided in the hydraulic brake system of the first embodiment.

FIG. 1 shows a hydraulic brake system according to a first embodiment and FIG. 2 shows a pressure regulator according to the first embodiment provided in the system. With reference to the drawings, the hydraulic brake system and the pressure regulator of the first embodiment will be explained below.

<Hardware Structure of Hydraulic Brake System>

1. Overall Structure

The hydraulic brake system according to the first embodiment of the invention is a hydraulic brake system that is installed on hybrid vehicles and that uses a brake oil as a working fluid. As shown in FIG. 1, the present hydraulic brake system generally includes (A) four brake devices 12 which are provided for respective four wheels 10 and each of which is configured to generate a braking force, (B) a master cylinder device 16 to which is input an operation of a brake pedal 14 as a brake operation member and which is configured to supply a pressurized working fluid to each brake device 12, (C) an antilock unit 18 disposed between the master cylinder device 16 and the four brake devices 12, (D) a high-pressure-source device 22, as a high-pressure source, configured to pump up the working fluid from a reservoir 20 (in which the working fluid having the atmospheric pressure is accommodated in the present embodiment) as a low-pressure source and to pressurize the pumped fluid, so as to supply the working fluid that is highly pressurized, (E) a regulator 24, as a pressure regulator, configured to regulate a pressure of the working fluid supplied from the high-pressure-source device 22 and to supply, to the master cylinder device 16, the working fluid whose pressure is regulated, (F) an electromagnetic pressure-increase linear valve 26 and an electromagnetic pressure-decrease linear valve 28 (hereinafter simply referred to as "pressure-increase linear valve 26" and "pressure-decrease linear valve 28", respectively, where appropriate) for adjusting a pressure of the working fluid supplied from the regulator 24, and (G) a brake electronic control unit 30, as a controller, configured to control the hydraulic brake system by controlling the devices, equipment, valves, and so on. The regulator 24 is a pressure regulator according to the first embodiment, and the pressure-increase linear valve 26 and the pressure-decrease linear valve 28 constitute a pressure adjuster that will be later explained, namely, a pilot-pressure adjuster 32 configured to adjust a pilot pressure of the regulator 24.

The antilock unit 18 may be referred to as "ABS unit 18" where appropriate and a sign "ABS" is attached in FIG. 1. The pressure-increase linear valve 26 and the pressure-decrease linear valve 28 are respectively marked with signs "SLA" and "SLR" in FIG. 1. The brake electronic control unit 30 may be referred to as "brake ECU 30" where appropriate and is marked with a sign "ECU" in FIG. 1. Where it is necessary to distinguish the four wheels 10 in terms of "front", "rear", "right", and "left", the four wheels 10 are indicated as a front right wheel 10FR, a front left wheel 10FL, a rear right wheel 10RR, and a rear left wheel 10RL, respectively. Where it is necessary to similarly distinguish the constituent elements, the same suffixes as used for the wheels 10 are used. For instance, the four brake devices 12 are indicated as 12FR, 12FL, 12RR, and 12RL, respectively, where appropriate.

2. Brake Devices and ABS Unit

Each of the brake devices 12 provided for the respective wheels 10 is a disc brake device including a disc rotor that rotates together with the wheel 10, a caliper held by a carrier, a wheel cylinder held by the caliper, and brake pads held by the caliper and configured to be moved by the wheel cylinder so as to sandwich the disc rotor. The ABS unit 18 is a unit constituted by four pairs of open/close valves corresponding to the four wheels, a pump device, and so on. One of the open/close valves in each pair is a pressure-increase open/close valve while the other of the open/close valves in each pair is a pressure-decrease open/close valve. The ABS unit 18 is configured to be activated when the wheels 10 are locked due to skidding or the like, so as to prevent the lock of the wheels from being continued. Each brake device 12 and the ABS unit 18 are an ordinary device and an ordinary unit and have low relevance to the features of the claimable invention. Accordingly, a detailed explanation of the brake devices 12 and the ABS unit 18 is dispensed with.

3. Master Cylinder Device

The master cylinder device 16 is a master cylinder device in which a stroke simulator is integrally incorporated. In general, the master cylinder device 16 has a housing 40 in which two pressurizing pistons, i.e., a first pressurizing piston 42 and a second pressurizing piston 44, and an input piston 46 are disposed, and a stroke simulator mechanism 48 is incorporated in the housing 40. In the following explanation about the master cylinder device 16, a leftward direction and a rightward direction in FIG. 1 are respectively referred to as a forward direction and a rearward direction for the sake of convenience. Similarly, a leftward movement and a rightward movement of the pistons, etc., explained below are respectively referred to as a forward or advancing movement and a rearward or retracting movement.

The housing 40 has a space in which are accommodated the first pressurizing piston 42, the second pressurizing piston 44, and the input piston 46. The space is closed at its front-side end and is partitioned by an annular partition portion 50 into a front-side chamber 52 and a rear-side chamber 54. The second pressurizing piston 44 has a cylindrical shape which is open on its front side and closed on its rear side. The second pressurizing piston 44 is disposed at a front-side portion of the front-side chamber 52. The first pressurizing piston 42 has a main body portion 56 and a flange portion 58 formed around an outer circumference of the main body portion 56. A front-side portion of the main body portion 56 has a cylindrical shape whose one end is closed and is disposed, together with the flange portion 58, rearward of the second pressurizing piston 44 in the front-side chamber 52. A rear-side portion of the main body portion 56 is a protruding portion 60 and extends into the rear-side chamber 54. More specifically, the annular partition portion 50 of the housing 40 has an opening 62 at its central portion, and the protruding portion 60 extends into the rear-side chamber 54 through the opening 62. The input piston 46 is disposed in the rear-side chamber 54 such that the input piston 46 partially extends into the rear-side chamber 54 from the rear side. The brake pedal 14 is connected to a rear end of the input piston 46 via link rod 64.

A first pressurizing chamber R1 is formed between the first pressurizing piston 42 and the second pressurizing piston 44, more specifically, on the front side of the main body portion 56 of the first pressurizing piston 42. In the first pressurizing chamber R1, the working fluid to be supplied to the two brake devices 12RR, 12RL corresponding to the respective two rear wheels 10RR, 10RL is pressurized by a forward movement of the first pressurizing piston 42. Further, a second pressurizing chamber R2 is formed on the front side of the second pressurizing piston 44. In the second pressurizing chamber R2, the working fluid to be supplied to the two brake devices 12FR, 12FL corresponding to the respective two front wheels 10FR, 10FL is pressurized by a forward movement of the second pressurizing piston 44. Further, an inter-piston chamber R3 is formed between the first pressurizing piston 42 and the input piston 46. More specifically, the inter-piston chamber R3 is formed such that a rear end of the protruding portion 60 that extends rearward from the opening 62 formed in the partition portion 50, namely, a rear end of the main body portion 56, and a front end of the input piston 46 face to each other. In other words, the inter-piston chamber R3 is formed such that the first pressurizing piston 42 and the input piston 46 face to each other utilizing the opening 62. Further, in the front-side chamber 52 of the housing 40, there are formed: an annular input chamber R4 to which the working fluid supplied from the regulator 24 is input; and an annular input-chamber opposing chamber R5. More specifically, the input chamber R4 is formed around an outer circumference of the protruding portion 60 so as to be defined by a front end face of the partition portion 50 and a rear end face of the flange portion 56 of the first pressurizing piston 42. The input-chamber opposing chamber R5 is formed forward of the flange portion 56 around an outer circumference of the main body portion 56 such that the input-chamber opposing chamber R5 is opposed to the input chamber R4 with the flange portion 58 interposed therebetween.

In the present master cylinder device 16, a pressure receiving area (pressure receiving area with respect to the inter-piston chamber) of the first pressurizing piston 42 on which a pressure of the working fluid in the inter-piston chamber R3 acts for moving the first pressurizing piston 42 forward, namely, an area of a rear end face of the protruding portion 60 of the first pressurizing piston 42, is made equal to a pressure receiving area (pressure receiving area with respect to the input-chamber opposing chamber) on which a pressure of the working fluid in the input-chamber opposing chamber R5 acts for moving the first pressurizing piston 42 rearward, namely, an area of a front end face of the flange portion 58 of the first pressurizing piston 42.

The first pressurizing chamber R1 is fluidly communicable with the reservoir 20 via a low-pressure port P1 when the first pressurizing piston 42 is located at a rear end position in its movement range while the second pressurizing chamber R2 is fluidly communicable with the reservoir 20 via a low-pressure port P2 when the second pressurizing piston 44 is located at a rear end position in its movement range. The first pressurizing chamber R1 and the second pressurizing chamber R2 communicate with the brake devices 12 via respective output ports P3, P4 and via the ABS unit 18. Further, the input chamber R4 communicates with a regulated-pressure port of the regulator 24 (that will be later explained) via an input port P5.

The inter-piston chamber R3 communicates with a communication port P6 while the input-chamber opposing chamber R5 communicates with a communication port P7. The communication port P6 and the communication port P7 are connected by an inter-chamber communication passage 70 as an external communication passage. At a certain position in the inter-chamber communication passage 70, there is provided a normally closed electromagnetic open/close valve 72, namely, an open/close valve 72 configured to be closed in a non-energized state and opened in an energized state. When the open/close valve 72 is placed in an open state, the inter-piston chamber R3 and the input-chamber opposing chamber R5 are brought into communication with each other. In a state in which the inter-piston chamber R3 and the input-chamber opposing chamber R5 are held in communication with each other, the chambers R3, R5 define one fluid chamber, namely, a fluid chamber that may be referred to as a reaction-force chamber R6. The open/close valve 72 has a function of switching between: communication between the inter-piston chamber R3 and the input-chamber opposing chamber R5; and shutting off of the communication therebetween. In view of this, the open/close valve 72 will be hereinafter referred to as "inter-chamber-communication switching valve 72" where appropriate.

The master cylinder device 16 further has low-pressure ports P8, P9 that communicate with each other via an internal passage. The low-pressure port P8 is connected to the reservoir 20 while the low-pressure port P9 is connected, between the inter-chamber-communication switching valve 72 and the input-chamber opposing chamber R5, to the inter-chamber communication passage 70 via a low-pressure-source communication passage 74 as an external communication passage. In the low-pressure-source communication passage 74, there is provided a normally open electromagnetic open/close valve 76, namely, an open/close valve 76 configured to be opened in a non-energized state and closed in an energized state. The open/close valve 76 has a function of switching between: communication between the input-chamber opposing chamber R5 and the reservoir 20 as the low-pressure source; and shutting off of the communication therebetween. In view of this, the open/close valve 76 will be hereinafter referred to as "low-pressure-source-communication switching valve 76" where appropriate.

The housing 40 has a space different from the space in which the first pressurizing piston 42, the second pressurizing piston 44, and the input piston 46 are disposed. The stroke simulator mechanism 48 is constituted by the space in question, a reaction-force piston 80 disposed in the space, and two reaction-force springs 82, 84 (both of which are compression coil springs) for biasing the reaction-force piston 80. On the rear side of the reaction-force piston 80, a buffer chamber R7 is formed. (In FIG. 1, the buffer chamber R7 is illustrated in an almost deflated or compressed state). When the input piston 46 moves forward by an operation of the brake pedal 14, the working fluid in the input-chamber opposing chamber R5, i.e., the working fluid in the reaction-force chamber R6, is introduced into the buffer chamber R7 via an inner passage, and elastic reaction forces of the reaction-force spring 82, 84 in accordance with the amount of the introduced working fluid, namely, in accordance with the amount of the forward movement of the input piston 46, act on the reaction-force chamber R6, whereby an operation reaction force is applied to the brake pedal 14. That is, the stroke simulator mechanism 48 functions as a reaction-force applying mechanism for applying, to the input piston 46, a reaction force against the forward movement of the input piston 46 having a magnitude in accordance with the amount of the forward movement of the input piston 46. The two reaction-force springs 82, 84 are disposed in series, and the reaction-force spring 84 has a spring constant considerably smaller than that of the reaction-force spring 82. Thus, the stroke simulator mechanism 48 is configured to effectuate reaction-force characteristics in which an increase gradient of the reaction force becomes large from a certain point in the progress of the operation of the brake pedal 14 by inhibiting the reaction-force spring 84 from being deformed at the certain point in the progress of the operation of the brake pedal 14. In the present system, there is provided, in the inter-chamber communication passage 70, a reaction-force pressure sensor 86 for detecting a pressure of the working fluid in the reaction-force chamber R6 (reaction-force pressure). (In FIG. 1, the reaction-force pressure sensor 86 is marked with a sign "$P_{RCT}$" indicative of the reaction-force pressure.)

4. High-Pressure-Source Device

The high-pressure-source device 22 includes: a pump 90 configured to pump up the working fluid from the reservoir 20 and to pressurize the pumped working fluid; a motor 92 for driving the pump 90; and an accumulator 94 (that is marked with a sign "ACC" in FIG. 1) for accumulating the working fluid pressurized by the pump 90. The high-pressure-source device 22 is provided with a high-pressure-source pressure sensor 96 for detecting a pressure of the working fluid in the accumulator 94, namely, for detecting a pressure of the working fluid to be supplied, i.e., a high-pressure-source pressure (that may be referred to as "accumulator pressure"). (In FIG. 1, the high-pressure-source pressure is marked with a sign "$P_{ACC}$" indicative of the high-pressure-source pressure.)

5. Regulator

As shown in the enlarged view of FIG. 2, the regulator 24 includes: a housing 100 having a two-piece structure and an interior space; and a piston 102, a ring-shaped valve seat 106, and a valve rod 108 that are disposed in the space of the housing 100 so as to be arranged in the axial direction of the housing 100, i.e., in the left-right direction. The piston 102 functions as a movable member and is movable in the axial direction of the housing 100. The piston 102 has a generally cylindrical shape and is constituted by: a main body portion 110 having a recess that is open at a right end thereof; and a plunger portion 112 fitted in the recess. The ring-shaped valve seat 106 is a cylindrical member which has a flange portion and which is open at opposite ends thereof. The ring-shaped valve seat 106 is floatingly supported by two springs 114, 116 with respect to the piston 102 and the housing 100. A left end portion of the valve rod 108 functions as a valve member. The valve rod 108 is disposed such that the left end portion thereof functioning as the valve member can be seated on a right end portion of the ring-shaped valve seat 106 functioning as a valve seat. The valve rod 108 is biased leftward by a spring 118. That is, the ring-shaped valve seat 106, the valve rod 108, and the spring 118 provide a valve mechanism 120 that is disposed so as to be arranged with the piston 102, as the movable member, in the axial direction of the housing 100. A distal (right) end of the plunger portion 112 of the piston 102 is arranged to be abuttable on the left end portion of the valve rod 108 within the ring-shaped valve seat 106. The outside diameter of the distal end of the plunger portion 112 is smaller than the inside diameter or the ring-shaped valve seat 106, whereby a clearance is formed therebetween. FIG. 2 shows a state in which the piston 102 is located, in the housing 100, at a left end position of its movable range, the valve rod 108 is seated on the ring-shaped valve seat 106, and the distal end of the plunger portion 112 is slightly spaced apart from the left end of the valve rod 108.

A plurality of fluid chambers are formed in the space of the housing 100. More specifically, a first pilot chamber R8 is formed on a first-direction side of the main body portion 110 of the piston 102, i.e., on a left side of the main body portion 110, so as to be defined by a left end portion of the main body portion 110 and the housing 100. The piston 102 has a flange portion 122 formed around an outer circumference of the main body portion 110. An annular second pilot chamber R9 is formed around the outer circumference of the main body portion 110 and is located on a first-direction side of the flange portion 122, i.e., on a left side of the flange portion 122, such that the second pilot chamber R9 is defined by a left end portion of the flange portion 122, a part of the outer circumferential portion of the main body portion 110, and the housing 100. In short, the two pilot chambers are formed in parallel to each other in the present regulator 24. Further, a regulated-pressure chamber R10 is formed around an outer circumference of the plunger portion 112 of the piston 102 generally between the main body portion 110 of the piston 102 and the flange portion of the ring-shaped valve seat 106. In the regulated-pressure chamber R10, there is accommodated the working fluid whose pressure is regulated and which is supplied from the regulator 24 to the master cylinder device 16. A high-pressure chamber R11 is formed around an outer circumference of the valve rod 108. The high-pressure chamber R11 communicates with the high-pressure-source device 22 as the high-pressure source and receives the working fluid supplied therefrom. Roughly, the regulated-pressure chamber R10 is formed on one side of the piston 102 near to the valve mechanism 120, and the high-pressure chamber R11 and the regulated-pressure chamber R10 sandwich the valve mechanism 120 therebetween. In the present regulator 24, on a second-direction side of the flange portion 122 of the piston 102 that is opposite to the above-indicated first-direction side, i.e., on a right side of the flange portion 122, an annular pilot-chamber opposing chamber R12 is formed around the outer circumference of the main body portion 110, such that the pilot-chamber opposing chamber R12 is defined by a right end portion of the flange portion 122, another part of the outer circumferential portion of the main body portion 110, and the housing 100. The pilot-chamber opposing chamber R12 is opposed to the second pilot chamber R9 with the flange portion 122 interposed therebetween.

The housing 100 is formed with various ports, and the fluid chambers described above communicate with various devices of the present system via the ports. More specifically, as shown in FIG. 1, the high-pressure chamber R11 communicates with the high-pressure-source device 22 via a high-pressure port P10. The regulated-pressure chamber R10 communicates with the input port P5 of the master cylinder device 16 via a regulated-pressure port P11. In the piston 102, there is formed a low-pressure passage 124 constituted by a fluid passage that penetrates the plunger portion 112 in the axial direction and a fluid passage that communicates with the above-indicated fluid passage and that penetrates the main body portion 110 in the diametric direction. Two low-pressure ports P12, P13 communicate with each other via the low-pressure passage 124. The low-pressure port P12 is connected to the low-pressure-source communication passage 74, whereby the low-pressure passage 124 communicates with the reservoir 20 via the master cylinder device 16. That is, the low-pressure passage 124 functions as a low-pressure chamber communicating with the low-pressure source. The low-pressure port P13 is connected, via a relief valve 126, to a high-pressure port P14 different from the high-pressure port P10. When a pressure in the high-pressure chamber R11 becomes excessively high, the pressure in the high-pressure chamber R11 is released to the reservoir 20.

The first pilot chamber R8 is connected to two first pilot ports P15, P16. The first pilot port P15 is connected to the high-pressure port P14 via the pressure-increase linear valve 26 while the first pilot port P16 is connected to the low-pressure-source communication passage 74 via the pressure-decrease linear valve 28. That is, the first pilot chamber R8 is connected to the high-pressure-source device 22 via the pressure-increase linear valve 26 and is connected to the reservoir 20 via the pressure-decrease linear valve 28. As explained later in detail, a first pilot pressure that is a pressure of the working fluid in the first pilot chamber R8 is adjusted by the pressure-increase linear valve 26 and the pressure-decrease linear valve 28 to a desired pressure (hereinafter referred to as "adjusted pressure" where appropriate), namely, the first pilot pressure is adjusted to an arbitrary adjusted pressure by the pilot-pressure adjuster 32. The second pilot chamber R9 is connected to a second pilot port P17 and communicates with the communication port P6 of the master cylinder device 16 via a pilot-pressure introduction passage 128. Accordingly, a pressure of the working fluid in the inter-piston chamber R3 of the master cylinder device 16 is introduced into the second pilot chamber R9 as a second pilot pressure. The pilot-chamber opposing chamber R12 is connected to an opposing-pressure port P18 and communicates with the communication port P7 of the master cylinder device 16 via an inter-opposing-chamber communication passage 130. Accordingly, there is introduced, into the pilot-chamber opposing chamber R12, a pressure of the working fluid in the input-chamber opposing chamber R5 of the master cylinder device 16.

In the present regulator 24, a pressure of the working fluid in the regulated-pressure chamber R10, namely, a supply pressure of the pressure regulator that is a pressure of the working fluid to be supplied from the regulator 24 (hereinafter referred to as "servo pressure" where appropriate) acts on the piston 102 such that the piston 102 is biased in the leftward direction that is a first direction. On the other hand, a pressure of the working fluid in the first pilot chamber R8, namely, the first pilot pressure, acts on the piston 102 such that the piston 102 is biased in a rightward direction that is a second direction. Similarly, a pressure of the working fluid in the second pilot chamber R9, namely, the second pilot pressure, acts on the piston 102 such that the piston 102 is biased in the rightward direction that is the second direction. Further, a pressure of the working fluid in the pilot-chamber opposing chamber R12 (hereinafter referred to as "opposing pressure" where appropriate) acts on the piston 102 such that the piston 102 is biased in the leftward direction that is the first direction.

Accordingly, the piston 102 undergoes a biasing force by the servo pressure (hereinafter referred to as "servo pressure force" where appropriate), a biasing force by the first pilot pressure (hereinafter referred to as "first pilot pressure force" where appropriate), a biasing force by the second pilot pressure (hereinafter referred to as "second pilot pressure force" where appropriate), and a biasing force by the opposing pressure (hereinafter referred to as "opposing pressure force" where appropriate). The piston 102 is moved in the housing 100 in the axial direction by the biasing forces, more specifically, by a sum of the biasing forces. Here, the "sum of the biasing forces" means a difference between the biasing forces where directions of the biasing forces are opposite to each other. More strictly, it is necessary to consider elastic reaction forces of the springs 114, 116, and so on. However, because the action of those elastic reaction forces is relatively small, the following explanation will be made disregarding the elastic reaction forces in the interest of brevity of explanation of the operation of the regulator 24.

Accordingly, where a biasing force that is a sum of the first pilot pressure force and the second pilot pressure force and that acts in the rightward direction (hereinafter referred to as "rightward biasing force" where appropriate) is larger than a biasing force that is a sum of the servo pressure force and the opposing pressure force and that acts in the leftward direction (hereinafter referred to as "leftward biasing force" where appropriate), the piston 102 is moved in the rightward direction, namely, toward the valve mechanism 120. On the other hand, where the leftward biasing force is larger than the rightward biasing force, the piston 102 is moved in the leftward direction, namely, in a direction away from the valve mechanism 120. Where the piston 102 is moved in the rightward direction, the piston 102 comes into engagement, at the distal end of the plunger portion 112, with the valve mechanism 120 and the distal end of the valve rod 108 is separated away from the ring-shaped valve seat 106, whereby the regulated-pressure chamber R10 and the high-pressure chamber R11 are brought into communication with each other by the valve mechanism 120. In this case, an opening of the low-pressure passage 124 formed at the distal end of the plunger portion 112 is closed by the distal end of the valve rod 108, whereby communication between the regulated-pressure chamber R10 and the low-pressure passage 124 is shut off. In short, there is effectuated a state in which communication between the regulated-pressure chamber R10 and the high-pressure chamber R11 is permitted while communication between the regulated-pressure chamber R10 and the low-pressure passage 124 as the low-pressure chamber is shut off. (For convenience sake, this state will be hereinafter referred to as "high-pressure-communication and low-pressure-shutoff state" where appropriate.) On the other hand, where the piston 102 is moved in the leftward direction as shown in FIG. 2, the distal end of the plunger portion 112 is disengaged from the valve mechanism 120 of the piston 102, whereby the communication between the regulated-pressure chamber R10 and the high-pressure chamber R11 is shut off. In this case, the opening of the low-pressure passage 124 is not closed by the distal end of the valve rod 108, and the regulated-pressure chamber R10 and the low-pressure passage 124 are brought into communication with each other. In short, there is effectuated a state in which the communication between the regulated-pressure chamber R10 and the high-pressure chamber R11 is shut off while the communication between the regulated-pressure chamber R10 and the low-pressure passage 124 as the low-pressure chamber is permitted. (For convenience sake, this state will be hereinafter referred to as "high-pressure-shutoff and low-pressure-communication state" where appropriate.) According to the operation of the regulator 24, the servo pressure that is the pressure of the working fluid in the regulated-pressure chamber R10 is regulated based on the first pilot pressure, the second pilot pressure, and the opposing pressure. The present system is provided with a servo pressure sensor 134 for detecting the servo pressure. (In FIG. 1, the servo pressure sensor 134 is marked with a sign "$P_{SRV}$" indicative of the servo pressure.)

6. Pressure-Increase Linear Valve and Pressure-Decrease Linear Valve

The pressure-increase linear valve 26 and the pressure-decrease linear valve 28 are ordinary electromagnetic linear valves, and illustration of the structure thereof is dispensed with. The pressure-increase linear valve 26 is a normally closed electromagnetic linear valve disposed between the high-pressure-source device 22 and the first pilot chamber R8 of the regulator 24. The pressure-increase linear valve 26 has a plunger whose distal end functions as a valve member and a valve seat on which the plunger is seated. In the pressure-increase linear valve 26, there are formed: an adjusted-pressure chamber which is located on one of opposite sides of the valve seat nearer to the plunger and which communicates with the first pilot chamber R8 of the regulator 24 for accommodating the working fluid having the adjusted pressure corresponding to the first pilot pressure of the first pilot chamber R8; and a high-pressure chamber which is located on the other of the opposite sides of the valve seat remote from the plunger and which communicates with the high-pressure-source device 22 for receiving the working fluid having the high-pressure-source pressure. There acts, on the plunger, a pressure-difference-based acting force based on a pressure difference between the high-pressure-source pressure and the adjusted pressure, in a direction in which the plunger is separated away from the valve seat. At the same time, the plunger is biased in a direction in which the plunger is seated on the valve seat by a biasing force of a spring that is larger than the pressure-difference-based acting force. By energization of the coil, there also acts, on the plunger, an electromagnetic acting force having a magnitude in accordance with an energizing current supplied to a coil in the same direction as the pressure-difference-based acting force, namely, in a direction opposite to the biasing force of the spring. Roughly, in the present pressure-increase linear valve 26, the energizing current is determined such that an arbitrary adjusted pressure is obtained while considering a balance among the pressure-difference-based acting force, the electromagnetic acting force, and the biasing force, and the determined energizing current is supplied to the coil. It is noted that, in the pressure-increase linear valve 26, the adjusted pressure increases with an increase in the energizing current. In other words, an opening degree (e.g., a degree of easiness with which the valve changes from the closed state to the open state) becomes higher and a valve-opening pressure becomes higher, with an increase in the energizing current.

The pressure-decrease linear valve 28 is a normally open electromagnetic linear valve disposed between the first pilot chamber R8 of the regulator 24 and the reservoir 20 as the low-pressure source. The pressure-decrease linear valve 28 has a plunger whose distal end functions as a valve member and a valve seat on which the plunger is seated. In the pressure-decrease linear valve 28, there are disposed: a low-pressure chamber which is located on one of opposite sides of the valve seat nearer to the plunger and which communicates with the reservoir 20 so as to have a low-pressure-source pressure (i.e., the atmospheric pressure in the present embodiment); and an adjusted-pressure chamber which is located on the other of the opposite sides of the valve seat remote from the plunger and which communicates with the first pilot chamber R8 of the regulator 24 for accommodating the working fluid having the adjusted pressure corresponding to the first pilot pressure. There acts, on the plunger, a pressure-difference-based acting force based on a pressure difference between the adjusted pressure and the low-pressure-source pressure, in a direction in which the plunger is separated away from the valve seat. At the same time, the plunger is biased by a biasing force of a spring in the same direction as the pressure-difference-based acting force. By energization of the coil, there also acts, on the plunger, an electromagnetic acting force having a magnitude in accordance with an energizing current supplied to a coil in a direction opposite to the pressure-difference-based acting force and the biasing force. Roughly, in the present pressure-decrease linear valve 28, the energizing current is determined such that an arbitrary adjusted pressure is obtained while considering a balance among the pressure-difference-based acting force, the electromagnetic acting force, and the biasing force, and the determined energizing current is supplied to the coil. It is noted that, in the pressure-decrease linear valve 28, the adjusted pressure increases with an increase in the energizing current. In other words, an opening degree (e.g., a degree of easiness with which the valve changes from the closed state to the open state) becomes lower and a valve-opening pressure becomes higher, with an increase in the energizing current.

From the viewpoint of the functions of the pressure-increase linear valve 26 and the pressure-decrease linear valve 28 described above, in the present system, the pressure-increase linear valve 26 and the pressure-decrease linear valve 28 provide the pilot-pressure adjuster 32. The first pilot pressure of the regulator 24 is adjusted by controlling the energizing currents respectively supplied to the pressure-increase linear valve 26 and the pressure-decrease linear valve 28.

7. Control System

A control of the present system is executed by the brake ECU 30. Roughly, the brake ECU 30 controls the high-pressure-source device 22, specifically, the pump 90, more specifically, the motor 92 configured to drive the pump 90. Further, the brake ECU 30 controls the inter-chamber-communication switching valve 72 and the low-pressure-source-communication switching valve 74, specifically, executes an opening and closing control of each of the valves 72, 74. Moreover, the brake ECU 30 controls the pressure-increase linear valve 26 and the pressure-decrease linear valve 28, specifically, controls the energizing currents supplied thereto. The brake ECU 30 is constituted by a computer as a main element and drive circuits (drivers) for driving the motor 92 of the high-pressure-source device 22, the pressure-increase linear valve 26, the pressure-decrease linear valve 28, the inter-chamber-communication switching valve, and the low-pressure-source-communication switching valve 74, respectively.

To the brake ECU 30, the reaction-force pressure sensor 86, the high-pressure-source pressure sensor 96, and the servo pressure sensor 134 are connected. The present system is provided with a brake operation amount sensor 140 for detecting a brake operation amount and a brake operation force sensor 142 for detecting a brake operation force, as operation information of the brake pedal 14 functioning as the brake operation member. (In FIG. 1, the brake operation amount sensor 140 is marked with a sign "$\delta_{PDL}$" indicative of the brake operation amount while the brake operation force sensor 142 is marked with a sign "$F_{PDL}$" indicative of the brake operation force.) These sensors 140, 142 are also connected to the brake ECU 30. The control in the present system is executed based on the values detected by the sensors.

<Operation of Hydraulic Brake System>

In the present system, the operation mode of the master cylinder device 16 is switched and the pressure regulating mode of the regulator 24 is switched, depending upon a status of the vehicle. There will be explained how the hydraulic brake system operates in relation to the switching of the modes.

1. Operation in Non-Electricity-Supply State

No electricity is supplied to the system in a non-electricity supply state such as before the startup of the system and in the event of electrical failure. Accordingly, the inter-chamber-communication switching valve 72 is in the closed state, and the low-pressure-source-communication switching valve 76 is in the open state. Therefore, communication between the inter-piston chamber R3 and the input-chamber opposing chamber R5 of the master cylinder device 16 is shut off, and the input-chamber opposing chamber R5 communicates with the reservoir 20, so as to be exposed to the low-pressure-source pressure. In this condition, the brake operation force applied to the brake pedal 14 is transmitted to the first pressurizing piston 42 via the working fluid in the inter-piston chamber R3. That is, transmission of the brake operation force from the input piston to the first pressurizing piston 42 and the second pressurizing piston 44 is permitted, whereby the first pressurizing piston 42 and the second pressurizing piston 44 move forward. As a result, the brake devices 12 generate the braking force whose magnitude depends on the brake operation force applied to the brake pedal 14. That is, the master cylinder device 16 operates in a pressurizing mode depending on the operation force in which the working fluid to be supplied therefrom to the brake devices 12 is pressurized to a pressure at which the brake devices 12 generate the braking force having a magnitude in accordance with the brake operation force. In short, a master pressure that is a pressure of the working fluid to be supplied from the master cylinder device 16 to the brake devices 12 is made equal to a pressure in accordance with the brake operation force.

Before the startup of the system and in the event of electrical failure, it is supposed that the working fluid having a high pressure is not present in the accumulator 94 of the high-pressure-source device 22. Because no energizing current is supplied to the pressure-increase linear valve 26 and the pressure-decrease linear valve 28, the first pilot pressure of the regulator 24 is kept at the low-pressure-source pressure. The pilot-pressure introduction passage 128 is configured to introduce the working fluid in the inter-piston chamber R3 as the second pilot pressure to the second pilot chamber R9 from between the inter-piston chamber R3 of the master cylinder device 16 and the inter-chamber-communication switching valve 72. Accordingly, the second pilot pressure is equal to an operation-force-dependent pressure that is a pressure in accordance with the brake operation force. The pilot-chamber opposing chamber R12 communicates with the reservoir 20 via the inter-opposing-chamber communication passage 130, and the low-pressure-source communication passage 74, and the opposing pressure is equal to the low-pressure-source pressure. Accordingly, the regulator 24 operates in a pressure regulating mode depending on the second pilot pressure in which the pressure is regulated depending only on the second pilot pressure. However, if it is supposed that the high-pressure working fluid is not present in the accumulator 94, the working fluid in the regulated-pressure chamber R10 of the regulator 24 is substantially kept at the low-pressure-source pressure, and only the low-pressure-source pressure is substantially introduced into the input chamber R4 of the master cylinder device 16.

In the present system, the master cylinder device 16 operates in the pressurizing mode depending on the operation force, thereby enabling the brake devices 12 to generate the braking force even in the event of electrical failure. Therefore, the present system is excellent in terms of failsafe.

2. Operation in Normal State

In a normal state after the startup of the system, the inter-chamber-communication switching valve 72 is placed in the open state while the low-pressure-source-communication switching valve 76 is placed in the closed state. As a result, the communication between the inter-piston chamber R3 and the input-chamber opposing chamber R5 is permitted, and communication of the chambers R3, R5 with the reservoir 20 as the low-pressure source is shut off. Accordingly, the inter-piston chamber R3 and the input-chamber opposing chamber R5 constitute the reaction-force chamber R6, and a pressure of the working fluid in the reaction-force chamber R6 is equal to a pressure in accordance with the brake operation force, namely, the operation-force-dependent pressure. In this state, however, the pressure receiving area with respect to the inter-piston chamber is made equal to the pressure receiving area with respect to the input-chamber opposing chamber. Therefore, even if the input piston 46 is moved forward by operating the brake pedal 14, the first pressurizing piston 42 and the second pressurizing piston 44 are not moved forward by the brake operation force, i.e., by the pressure in the reaction-force chamber R6, and the working fluid pressurized by the master cylinder device 16 is not supplied to the brake devices 12. In other words, transmission of the brake operation force from the input piston 46 to the first pressurizing piston 42 and the second pressurizing piston 44 via the working fluid in the inter-piston chamber R3 is prohibited.

In the normal state, driving of the pump 90 is controlled, so that the working fluid supplied from the high-pressure-source device 22 is kept at a high pressure within a set range. The energizing currents supplied to the respective pressure-increase linear valve 26 and pressure-decrease linear valve 28 are controlled, whereby the first pilot pressure is made equal to an arbitrary pressure. To both of the second pilot chamber R9 and the pilot-chamber opposing chamber R12, the pressure of the working fluid in the reaction-force chamber R6 is introduced, so that the second pilot pressure and the opposing pressure are made equal to each other. Because an area of a left end face and an area of a right end face of the flange portion 122 of the piston 102 of the regulator 24 are equal to each other, the second pilot pressure force and the opposing pressure force are balanced, in other words, the biasing by the opposing pressure cancels the biasing by the second pilot pressure, so that the regulator 24 regulates, based on the first pilot pressure, the pressure of the working fluid to a pressure in accordance with the first pilot pressure and supplies the regulated pressure to the input chamber R4 of the master cylinder device 16. That is, the servo pressure that is the supply pressure of the pressure regulator is regulated by the regulator 24 in a pressure regulating mode depending on the first pilot pressure in which the servo pressure is regulated depending only on the first pilot pressure.

When the working fluid whose pressure is regulated by the regulator 24 and which is supplied from the same 24 is introduced into the input chamber R4, the first pressurizing piston 42 and the second pressurizing piston 44 move forward depending on the pressure of the thus introduced working fluid, i.e., the servo pressure, and the working fluid pressurized in accordance with the servo pressure is supplied to the brake devices 12. That is, the master cylinder device 16 operates in a pressurizing mode depending on the supply pressure of the pressure regulator in which the working fluid to be supplied therefrom to the brake devices 12 is pressurized to a pressure at which the brake devices 12 generate the braking force having a magnitude in accordance with the servo pressure. In short, the master pressure is made equal to a pressure in accordance with the servo pressure.

The vehicle on which the present system is installed is hybrid vehicles as described above, and a regenerative braking force is accordingly available. Accordingly, it is needed for the brake devices 12 to generate a braking force that corresponds to a difference by subtracting the regenerative braking force from a braking force determined based on the braking operation. In the normal state, therefore, the first pilot pressure is controlled based on the braking force that should be generated by the system, such that the servo pressure detected by the servo pressure sensor 134 becomes equal to a pressure at which the braking force can be generated, by controlling the energizing currents to be respectively supplied to the pressure-increase linear valve 26 and the pressure-decrease linear valve 28. In the present system, the master cylinder device 16 is operated, in the normal state, in the pressurizing mode depending on the supply pressure of the pressure regulator, whereby the brake devices 12 generate the braking force that does not depend on the brake operation force. In other words, a pressure that is different from a pressure based only on the brake operation amount and the brake operation force is introduced as the first pilot pressure, and pressure regulation by the regulator 24 is conducted by the introduced pressure. It is accordingly possible to generate a braking force that does not depend on the braking operation. In view of the operation of the present system, the present hydraulic brake system is suitable for hybrid vehicles.

In the normal state, the servo pressure is regulated depending only on the first pilot pressure by the action of the opposing pressure. In other words, the braking force is accurately controlled only by the adjusted pressure adjusted by the pressure-increase linear valve 26 and the pressure-decrease linear valve 28, enabling a good brake control.

3. Operation in the Event of Specific Failure

For instance, suppose a case in which the servo pressure sensor 134, the pressure-increase linear valve 26, the pressure-decrease linear valve 28, and so on, fail to operate, and the energizing currents to be respectively supplied to the pressure-increase linear valve 26 and the pressure-decrease linear valve 28 cannot be controlled based on the servo pressure. In this case, it is possible to generate the braking force depending on the servo pressure where the high-pressure-source device 22 is controllable and the high-pressure-source pressure can be maintained within an appropriate pressure range or where the working fluid having a sufficiently high pressure remains in the accumulator 94 of the high-pressure-source device 22. Such a failure of the system in which the high-pressure-source pressure is available is regarded as "specific failure", and the present system operates as follows in the event of specific failure.

In the event of specific failure, by stopping the electricity supply to the inter-chamber-communication switching valve 72 and the low-pressure-source-communication switching valve 76, the inter-chamber-communication switching valve 72 is placed in the closed state while the low-pressure-source-communication switching valve 76 is placed in the open state. In this state, transmission of the brake operation force from the input piston to the first pressurizing piston 42 and the second pressurizing piston 44 is permitted, so that the brake devices 12 can generate the braking force whose magnitude depends on the brake operation force, as in the non-electricity-supply state explained above. On the other hand, because the high-pressure-source pressure is available in the event of specific failure, the pressure of the working fluid in the inter-piston chamber R3 of the master cylinder device 16, i.e., the operation-force-dependent pressure, is introduced into the second pilot chamber R9 as the second pilot pressure via the pilot-pressure introduction passage 128, and the pilot-chamber opposing chamber R12 is exposed to the low-pressure-source pressure. Thus, pressure regulation by the regulator 24 is conducted in the pressure regulating mode depending on the second pilot pressure, and the servo pressure regulated to a pressure that depends on the brake operation force is introduced into the input chamber R4 of the master cylinder device 16. As a result, the master cylinder device 16 pressurizes the working fluid to be supplied to the brake devices 12 to a pressure at which the brake devices 12 generate a braking force that is a sum of a braking force having a magnitude in accordance with the servo pressure and a braking force having a magnitude in accordance with the brake operation force.

That is, the master cylinder device 16 operates in a "pressurizing mode depending on the operation force and the supply pressure of the pressure regulator" in which the working fluid is pressurized depending on both of the brake operation force and the servo pressure. In short, the master pressure is made equal to a pressure in accordance with both of the brake operation force and the servo pressure.

The pressurizing mode depending on the operation force corresponds to a state in which the servo pressure from the regulator 24 is not introduced in the pressurizing mode depending on the operation force and the supply pressure of the pressure regulator. Accordingly, the pressurizing mode depending on the operation force may be considered as one arrangement of the pressurizing mode depending on the operation force and the supply pressure of the pressure regulator. Further, in the present system, the brake devices 12 can generate, in the event of specific failure described above, a braking force that is a sum of the braking force having a magnitude in accordance with the servo pressure and a braking force having a magnitude in accordance with the brake operation force. Accordingly, the braking force to be generated by the brake devices 12 is relatively large, and therefore the present system is excellent in terms of failsafe.

4. Mode Changing Function

As explained above, the master cylinder device 16 has a function of switching the operation mode between: the pressurizing mode depending on the operation force and the supply pressure of the pressure regulator (that is a concept including the pressurizing mode depending on the operation force); and the pressurizing mode depending on the supply pressure of the pressure regulator, depending upon the states of the inter chamber-communication switching valve 72 and the low-pressure-source-communication switching valve 76. In view of the function of switching the operation mode, the present system may be regarded as having an "operation-mode switching mechanism" constituted by the inter-chamber communication passage 70, the inter-chamber-communication switching valve 72, the low-pressure-source communication passage 74, and the low-pressure-source-communication switching valve 76. Further, in the present system, in conjunction with the switching of the operation mode of the master cylinder device 16, the pressure regulating mode of the regulator 24 is switched between: the pressure regulating mode depending on the first pilot pressure; and the pressure regulating mode depending on the second pilot pressure. In the present system, therefore, the operation-mode switching mechanism functions also as a pressure-regulating-mode switching mechanism configured to switch the pressure regulating mode of the regulator 24.

In the present system, the operation-mode switching mechanism functions also as the pressure-regulating-mode switching mechanism by employing the structure in which the inter-opposing-chamber communication passage 130 permits communication between the input-chamber opposing chamber R5 and the pilot-chamber opposing chamber R12 of the regulator 24 on one side of the low-pressure-source-communication switching valve 76 nearer to the input-chamber opposing chamber R5. Owing to the employment of the structure, the regulator 24 is capable of conducting pressure regulation that is selectively based on one of the first pilot pressure and the second pilot pressure without providing, in the pilot-pressure introduction passage 128, a pilot-pressure-introduction switching mechanism that will be explained, more specifically, a pilot-pressure-introduction switching valve configured to switch between: introduction of the working fluid in the inter-piston chamber R3 into the second pilot chamber R9; and prohibition of the introduction.

[B] Second Embodiment

Figure 3:
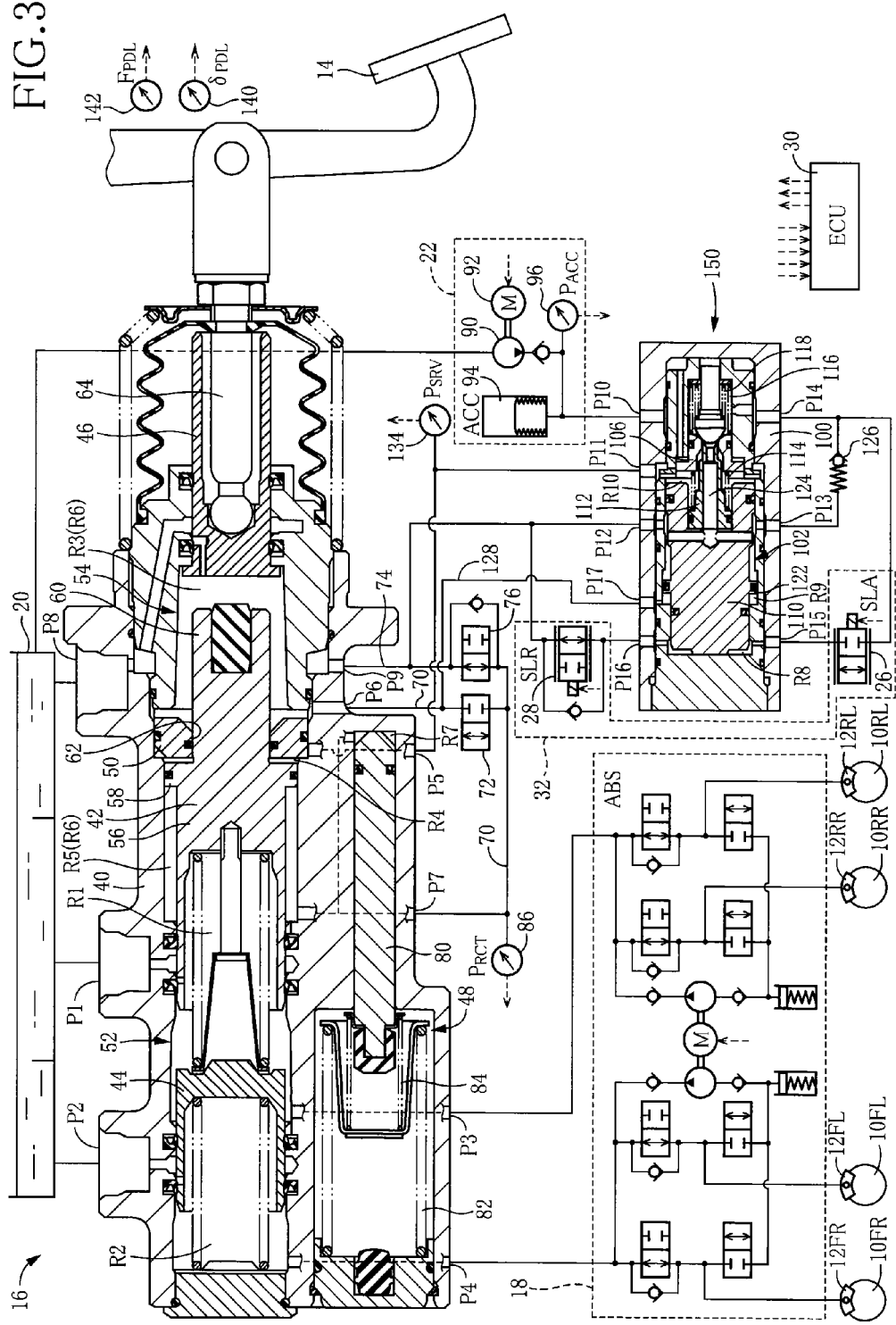
FIG. 3 is a view showing a hydraulic brake system according to a second embodiment.
Figure 4:
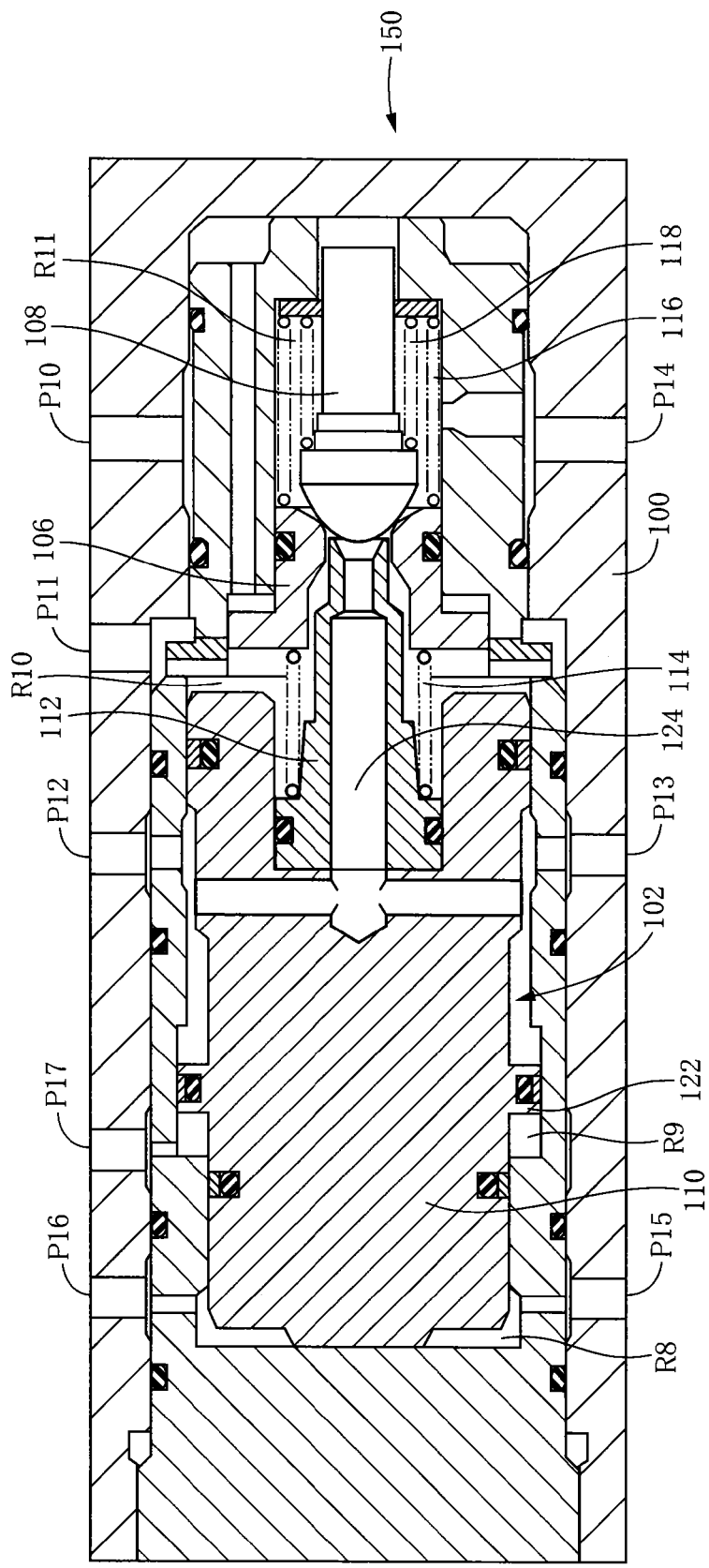
FIG. 4 is a view showing a pressure regulator according to the second embodiment provided in the hydraulic brake system of the second embodiment.
Figure 5:
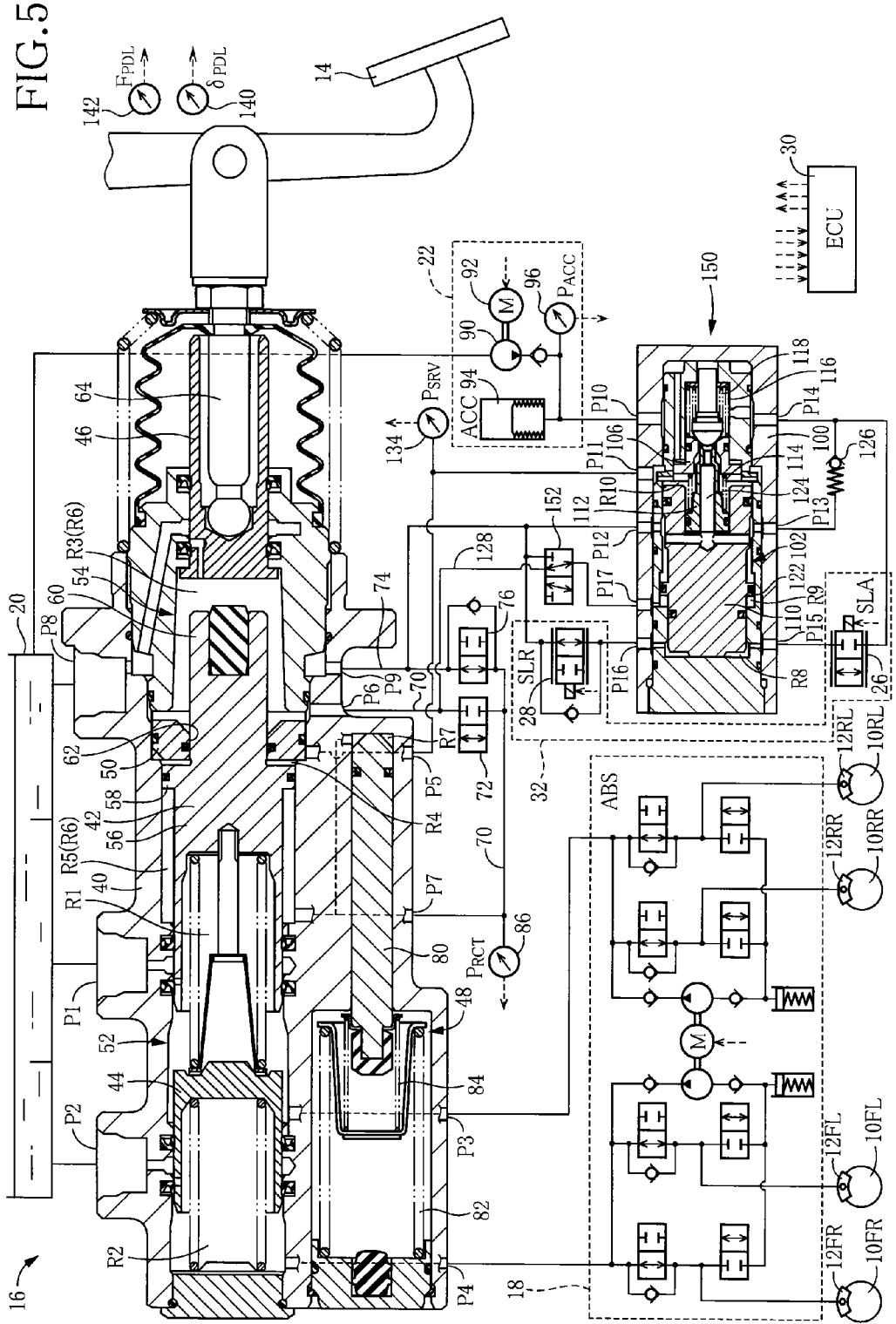
FIG. 5 is a view showing a hydraulic brake system according to a first modified example.

FIG. 3 shows a hydraulic brake system according to a second embodiment and FIG. 4 shows a pressure regulator according to the second embodiment provided in the system. The hydraulic brake system and the pressure regulator according to the second embodiment will be explained with reference to FIGS. 3 and 4.

<Hardware Structure of Hydraulic Brake System>

1. Overall Structure

The hydraulic brake system of the second embodiment is substantially identical in overall structure with the hydraulic brake system of the first embodiment. The brake devices 12, the ABS unit 18, the master cylinder device 16, the inter-chamber communication passage 70, the inter-chamber-communication switching valve 72, the low-pressure-source communication passage 74, the low-pressure-source-communication switching valve 76, the high-pressure-source device 22, the pressure-increase linear valve 26, the pressure-decrease linear valve 28, and the control system as employed in the hydraulic brake system of the first embodiment are employed in the hydraulic system of the second embodiment. The system of the second embodiment slightly differs from the system of the first embodiment in the structure of the pressure regulator and in connection between the regulator and the master cylinder device 16. Accordingly, the same reference numerals and signs as used in the first embodiment are used to identify constituent elements having the same or similar structures or functions in the second embodiment, and a detailed explanation thereof is dispensed with. In the system of the second embodiment, a regulator 150 is employed in place of the regulator 24 of the first embodiment. The regulator 150 is a pressure regulator of the second embodiment.

2. Regulator

As shown in the enlarged view of FIG. 4, the regulator 150 employed in the system of the second embodiment has substantially the same structure, except for a part thereof, as the regulator 24 of the first embodiment. That is, the regulator 150 differs from the regulator 24 in that the regulator 150 does not have the pilot-chamber opposing chamber R12 formed in the regulator 24 on the second-direction side of the flange portion 122 of the piston 102 opposite to the first-direction side, namely, formed on the right side of the flange portion 122. The portion of the regulator 150 corresponding to the pilot-chamber opposing chamber R12 of the regulator 24 is connected to the low-pressure passage 124 so as to function as a part of the low-pressure chamber. Accordingly, the opposing-pressure port P18 of the regulator 24 associated with the pilot-chamber opposing chamber R12 is not provided in the regulator 150. Further, the inter-opposing-chamber communication passage 130 is not provided in the system of the second embodiment.

In the present regulator 150, the servo pressure force, the first pilot pressure force, and the second pilot pressure force described above act on the piston 102, and the piston 102 is moved in the axial direction in the housing 100 by the biasing forces. In short, when a rightward biasing force that is a sum of the first pilot pressure force and the second pilot pressure force and that acts rightward is larger than the servo pressure force that is a leftward biasing force, the piston 102 is moved rightward. On the other hand, when the servo pressure force is larger than the rightward biasing force, the piston 102 is moved leftward. By the movement of the piston 102, one of the high-pressure-communication and low-pressure-shutoff state and the high-pressure-shutoff and low-pressure-communication state explained above is selectively effectuated.

<Operation of Hydraulic Brake System>

Also in the present system, the operation mode of the master cylinder device 16 is switched and the pressure regulating mode of the regulator 24 is switched, depending upon a status of the vehicle. The system of the second embodiment slightly differs from the system of the first embodiment in the switching of the pressure regulating mode. There will be explained how the hydraulic brake system operates in relation to the switching of the modes.

1. Operation in Non-Electricity-Supply State

As in the first embodiment, in the non-electricity-supply state, the inter-chamber-communication switching valve 72 is in the closed state and the low-pressure-source-communication switching valve 76 is in the open state. Accordingly, the master cylinder device 16 operates in the pressurizing mode depending on the operation force, and the regulator 150 conducts pressure regulation in the pressure regulating mode depending on the second pilot pressure. Similarly, if it is supposed that the high-pressure working fluid is not present in the accumulator 94, only the low-pressure-source pressure is substantially introduced into the input chamber R4 of the master cylinder device 16. As in the system of the first embodiment, in the present system, the master cylinder device 16 operates in the pressurizing mode depending on the operation force for enabling the brake devices 12 to generate the braking force even in the event of electrical failure. Therefore, the present system is excellent in terms of failsafe.

2. Operation in Normal State

As in the system of the first embodiment, in the normal state, the inter-chamber-communication switching valve 72 is placed in the open state and the low-pressure-source-communication switching valve 76 is placed in the closed state. As a result, the master cylinder device 16 operates in the pressurizing mode depending on the supply pressure of the pressure regulator. In the system of the second embodiment, the pilot-chamber opposing chamber is not provided. Accordingly, the opposing pressure force cannot be cancelled by the second pilot pressure force. In the regulator 150, therefore, the servo pressure is regulated based on both of the first pilot pressure and the second pilot pressure, more specifically, the servo pressure is regulated depending on a sum of the first pilot pressure force and the second pilot pressure force. That is, the regulator 150 regulates the servo pressure in a "pressure regulating mode depending on the first and second pilot pressures".

The second pilot pressure is equal to the above-indicated reaction-force pressure and can be detected by the reaction-force pressure sensor 86. Accordingly, the first pilot pressure is determined while considering the detected second pilot pressure, namely, while considering the second pilot pressure force by the second pilot pressure, such that the servo pressure in accordance with the braking force that should be generated by the brake devices is obtained. Further, the energizing currents to be respectively supplied to the pressure-increase linear valve 26 and the pressure-decrease linear valve 28 are controlled such that the first pilot pressure becomes equal to the determined pressure. Like the system of the first embodiment, the system of the second embodiment enables the brake devices 12 to generate the braking force that does not depend on the brake operation force, so that the present hydraulic brake system is suitable for hybrid vehicles.

3. Operation in the Event of Specific Failure

As in the system of the first embodiment, in the event of specific failure, the inter-chamber-communication switching valve 72 is placed in the closed state while the low-pressure-source-communication switching valve 76 is placed in the open state. In this state, the brake devices 12 can generate the braking force whose magnitude depends on the brake operation force, as in the non-electricity-supply state explained above. On the other hand, because the high-pressure-source pressure is available in the event of specific failure, the pressure of the working fluid in the inter-piston chamber R3 of the master cylinder device 16 is introduced into the second pilot chamber R9 as the second pilot pressure. Thus, pressure regulation by the regulator 150 is conducted in the pressure regulating mode depending on the second pilot pressure. As a result, the master cylinder device 16 operates in the pressurizing mode depending on the operation force and the supply pressure of the pressure regulator, as in the system of the first embodiment. Also in the present system, the brake devices 12 can generate, in the event of specific failure, a braking force that is a sum of the braking force having a magnitude in accordance with the servo pressure and the braking force having a magnitude in accordance with the brake operation force. Accordingly, the braking force to be generated by the brake devices 12 is relatively large, and the present system is therefore excellent in terms of failsafe.

4. Mode Changing Function

Like the system of the first embodiment, the system of the second embodiment may be regarded as having the operation-mode switching mechanism constituted by the inter-chamber communication passage 70, the inter-chamber-communication switching valve 72, the low-pressure-source communication passage 74, and the low-pressure-source-communication switching valve 76. It is noted, however, that the operation-mode switching mechanism of the system of the second embodiment does not function as the pressure-regulating-mode switching mechanism configured to switch the pressure regulating mode of the regulator 150, unlike the operation-mode switching mechanism of the system of the first embodiment.

[C] Modified Examples

There will be explained below some modified examples of the hydraulic brake system and the pressure regulator of the first embodiment and the second embodiment.

1. First Modified Example

A hydraulic brake system according to a first modified example differs from the hydraulic brake system according to the second embodiment in that there is provided, in the pilot-pressure introduction passage 128, a pilot-pressure-introduction switching valve 152 configured to switch between: introduction of the working fluid from the inter-piston chamber R3 of the master cylinder device 16 to the second pilot chamber R9 of the regulator 150; and prohibition of the introduction. That is, the system of the first modified example has a pilot-pressure-introduction switching mechanism constituted by the pilot-pressure-introduction switching valve 152. The pilot-pressure-introduction switching valve 152 is a three-way valve configured to bring the second pilot chamber R9 into communication with the inter-piston chamber R3 in a non-energized state and to permit the second pilot chamber R9 to communicate with the reservoir 20 in an energized state.

In the system according to the first modified example, in the non-electricity-supply state and in the event of specific failure, the pilot-pressure-introduction switching valve 152 is in the non-energized state, the pressure of the working fluid in the inter-piston chamber R3 that is the operation-force-dependent pressure is introduced into the second pilot chamber R9, and the servo pressure is regulated by the regulator 150 in the pressure regulating mode depending on the second pilot pressure. On the other hand, in the normal state, the pilot-pressure-introduction switching valve 152 is placed in the energized state, and the servo pressure is regulated by the regulator 150 in the pressure regulating mode depending on the first pilot pressure. As in the system of the first embodiment, in the system of this first modified example, the braking force is controlled only by the adjusted pressure adjusted by the pressure-increase linear valve 26 and the pressure-decrease linear valve 28. Accordingly, the present system ensures a good brake control by a simple control.

2. Second Modified Example

In the hydraulic brake systems according to the illustrated second embodiment and first modified example, the adjusted pressure adjusted by the pressure-increase linear valve 26 and the pressure-decrease linear valve 28 is introduced into the first pilot chamber R8 of the regulator 24, 150, and the pressure of the working fluid in the inter-piston chamber R3 as the operation-force-dependent pressure is introduced into the second pilot chamber R9. The arrangement may be modified such that the operation-force-dependent pressure is introduced into the first pilot chamber R8 and the adjusted pressure is introduced into the second pilot chamber R9. The thus arranged system enjoys advantages similar to those of the systems of the second embodiment and the first modified example.

3. Third Modified Example

In the hydraulic brake systems according to the illustrated first embodiment, second embodiment, and modified examples, the adjusted pressure adjusted by the pressure-increase linear valve 26 and the pressure-decrease linear valve 28 is introduced into one of the first pilot chamber R8 and the second pilot chamber R9 of the regulator 24, 150 while the pressure of the working fluid in the inter-piston chamber R3 as the operation-force-dependent pressure is introduced into the other of the first pilot chamber R8 and the second pilot chamber R9. The arrangement may be modified such that the master pressure is introduced into the other of the first pilot chamber R8 and the second pilot chamber R9. The master pressure may be regarded generally as a pressure in accordance with the brake operation force. Accordingly, the system in which the pressure regulator introduces the master pressure as the pilot pressure and the regulator 24, 150 regulates the servo pressure based on the pilot pressure ensures advantages substantially similar to those in the system in which the servo pressure is regulated based on the pressure of the working fluid in the inter-piston chamber R3 as the operation-force-dependent pressure.

4. Fourth Modified Example

In the regulator 24, 150 according to the illustrated embodiments and modified examples, the valve mechanism 120 is the so-called poppet valve structure. The pressure regulator is not particularly limited in terms of the structure of the valve mechanism. In place of the valve mechanism 120 of the poppet valve structure, the regulator may employ a valve mechanism of the so-called spool valve structure, for instance.

5. Fifth Modified Example

In the master cylinder device 16 provided in the systems according to the illustrated embodiments and modified examples, the inter-piston chamber R3 is defined as follows. The protruding portion 60 that is a rear portion of the main body portion 56 of the first pressurizing piston 42 extends into the rear-side chamber 54 through the opening 62 of the partition portion 50, and the rear end of the protruding portion 60 and the front end of the input piston 46 face to each other with the inter-piston chamber R3 interposed therebetween. The structure of the master cylinder device 16 is not particularly limited. For instance, the master cylinder device may be structured as follows. The main body portion of the first pressurizing piston may have a blind hole that is open on the rear side, and the input piston may extend into the blind hole through the opening of the partition portion. In the thus structured master cylinder device, the inter-piston chamber is defined such that the inner bottom of the blind hole and the front end of the input piston face to each other with the inter-piston chamber interposed therebetween.

[D] Comparative Example

In FIG. 6, a conventionally proposed hydraulic brake system is shown as a hydraulic brake system according to a comparative example. In FIG. 7, a pressure regulator provided in the system is shown as a pressure regulator according to the comparative example. With reference to FIGS. 6 and 7, the hydraulic brake system and the pressure regulator according to the comparative example will be explained below. Further, there will be discussed problems experienced in the system and the pressure regulator according to the comparative example.

<Hardware Structure of Hydraulic Brake System>

1. Overall Structure

The hydraulic brake system of the comparative example is substantially identical in overall structure with the hydraulic brake system of the second embodiment. The brake device 12, the ABS unit 18, the master cylinder device 16, the inter-chamber communication passage 70, the inter-chamber-communication switching valve 72, the low-pressure-source communication passage 74, the low-pressure-source-communication switching valve 76, the high-pressure-source device 22, the pressure-increase linear valve 26, the pressure-decrease linear valve 28, and the control system as employed in the system of the second embodiment are employed in the system of the comparative example. The system of the comparative example differs from the system of the second embodiment in the structure of the regulator as the pressure regulator and in connection between the regulator and the master cylinder device 16. Accordingly, the same reference numerals and signs as used in the second embodiment are used to identify constituent elements having the same or similar structures or functions in the comparative example, and a detailed explanation thereof is dispensed with. In the system of the comparative example, a regulator 160 is employed in place of the regulator 24 of the first embodiment. The regulator 160 is a pressure regulator of the comparative example.

2. Regulator

As shown in the enlarged view of FIG. 7, the regulator 160 employed in the system of the comparative example differs from the regulator 24, 150 of the illustrated embodiments in the structures of pistons and pilot chambers. More specifically, the regulator 160 of the comparative example has two pistons disposed in series, i.e., a first piston 162 and a second piston 164. The first piston 162 is disposed on the right side of the second piston 164 and corresponds to a right half portion of the piston 102 of the regulator 24, 150 in the illustrated embodiments. Accordingly, like the piston 102, the first piston 162 is constituted by the main body portion 110 and the plunger portion 112, and the low-pressure passage 124 functioning as the low-pressure chamber is provided therein. A first pilot chamber R8 is formed on the left side of the second piston 164 while a second pilot chamber R9 is formed on the right side of the second piston 164 so as to be interposed between the second piston 164 and the first piston 162. That is, in the regulator 160, the two pilot chambers are disposed in series with the first piston 162 interposed therebetween. As in the regulator 24, 150 of the illustrated embodiments, the adjusted pressure is introduced into the first pilot chamber R8 while the pressure of the working fluid in the inter-piston chamber R3 of the master cylinder device 16 that is the operation-force-dependent pressure is introduced into the second pilot chamber R9 via the pilot-pressure introduction passage 128.

In the regulator 160, the first pilot chamber R8 and the second pilot chamber R9 are disposed in series. Accordingly, the servo pressure is regulated in accordance with a higher one of; the adjusted pressure introduced as the first pilot pressure; and the pressure of the working fluid in the inter-piston chamber R3 of the master cylinder device 16 introduced as the second pilot pressure.

<Operation of Hydraulic Brake System>

Also in the system of the comparative example, the operation mode of the master cylinder device 16 is switched and the pressure regulating mode of the regulator 160 is switched, depending upon a status of the vehicle. The system of the comparative example slightly differs from the system of the illustrated embodiments in the switching of the pressure regulating mode. There will be explained how the hydraulic brake system operates in relation to the switching of the modes.

1. Operation in Non-Electricity-Supply State

As in the illustrated embodiments, in the non-electricity-supply state, the inter-chamber-communication switching valve 72 is in the closed state and the low-pressure-source-communication switching valve 76 is in the open state. Accordingly, the master cylinder device 16 operates in the pressurizing mode depending on the operation force. In this instance, the pilot pressure is not substantially introduced into the first pilot chamber R8 of the regulator 160, and the regulator 160 conducts pressure regulation in the pressure regulating mode depending on the second pilot pressure. However, if it is supposed that the high-pressure working fluid is not present in the accumulator 94, only the low-pressure-source pressure is substantially introduced into the input chamber R4 of the master cylinder device 16.

2. Operation in Normal State

As in the systems of the illustrated embodiments, the inter-chamber-communication switching valve 72 is placed in the open state and the low-pressure-source-communication switching valve 76 is placed in the closed state. As a result, the master cylinder device 16 operates in the pressurizing mode depending on the supply pressure of the pressure regulator. In the regulator 160, the pilot pressure is introduced into both of the first pilot chamber R8 and the second pilot chamber R9. In the system of the comparative example, the adjusted pressure is generally adjusted in the normal state such that the first pilot pressure is higher than the second pilot pressure. In the regulator 160, therefore, the servo pressure is regulated substantially in the pressure regulating mode depending on the first pilot pressure.

3. Operation in the Event of Specific Failure

As in the systems of the illustrated embodiments, in the event of specific failure, the inter-chamber-communication switching valve 72 is placed in the closed state and the low-pressure-source-communication switching valve 76 is placed in the open state. In this state, the brake devices 12 can generate the braking force whose magnitude depends on the brake operation force, as in the non-electricity-supply state explained above. On the other hand, because the high-pressure-source pressure is available in the event of specific failure, the pressure of the working fluid in the inter-piston chamber R3 of the master cylinder device 16 is introduced into the second pilot chamber R9 as the second pilot pressure. Thus, pressure regulation by the regulator 160 is conducted in the pressure regulating mode depending on the second pilot pressure.

<Problems Experienced in Comparative Example>

The system of the comparative example employs the regulator 160 in which the first pilot chamber R8 and the second pilot chamber R9 are disposed in series as explained above. Accordingly, in a case in which the working fluid flows into both of the two pilot chambers R8, R9, a variation in one of the first pilot pressure and the second pilot pressure causes a relatively large variation in the other of the first pilot pressure and the second pilot pressure, impairing good control of the braking force and good braking operation feeling.

For instance, the system of the comparative example suffers from the following phenomenon. In the regulator 160, in the non-electricity-supply state before the startup of the system, the working fluid in the inter-piston chamber R3 of the master cylinder device 16 has already flowed into the second pilot chamber R9. When this state is shifted to the normal state, the working fluid having the adjusted pressure flows into the first pilot chamber R8. The inflow of the working fluid having the adjusted pressure increases the first pilot pressure, and the second pilot pressure is accordingly increased, resulting in a phenomenon of a relatively large increase in the pressure of the working fluid in the inter-piston chamber R3 of the master cylinder device 16 that is the operation-force-dependent pressure. The increase in the pressure of the working fluid in the inter-piston chamber R3 is transmitted to the foot of the driver who is operating the brake pedal 14, giving the driver a relatively large unnatural feeling with respect to the braking operation. In short, the driver feels as if the brake pedal 14 largely returns, whereby the braking operation feeling is relatively largely impaired.

To prevent such a phenomenon, it is necessary to provide a pilot-pressure-introduction switching mechanism. For instance, it is necessary to provide, in the pilot-pressure-introduction passage 128, the pilot-pressure-introduction switching valve 152 shown in the broken line in FIG. 6, as employed in the system of the first modified example.

Even in a system arranged such that the master pressure is introduced into the second pilot chamber R9, a variation in the first pilot pressure causes a variation in the master pressure, and the variation in the master pressure is transmitted to the brake pedal 14 via the inter-piston chamber R3. Accordingly, the thus arranged system also suffers from the phenomenon described above.

[E] Advantages of Present Systems with Respect to Problems Experienced in Comparative System In the system of the comparative example, the first pilot chamber R8 and the second pilot chamber R9 are disposed in series in the regulator 160. Therefore, a variation in one of the first pilot pressure and the second pilot pressure largely influences the other of the first pilot pressure and the second pilot pressure.

In contrast, in the systems of the illustrated embodiments, the first pilot chamber R8 and the second pilot chamber R9 are disposed in parallel to each other in the regulator 24, 150.

Accordingly, even when the working fluid flows into both of the two pilot chambers R8, R9, the influence of a variation in one of the first pilot pressure and the second pilot pressure on the other of the first pilot pressure and the second pilot pressure is relatively small. Therefore, good control of the braking force and good braking operation feeling are ensured, so that the systems of the illustrated embodiments are highly advantageous with respect to the problems over the system of the comparative example.

In the system of the second embodiment, in particular, it is possible to suppress or reduce the phenomenon that occurs when shifting to the normal state, without providing the pilot-pressure-introduction switching mechanism described above. Accordingly, the system of the second embodiment has a considerably high degree of utility also in terms of the cost. In the system of the first embodiment, the influence of the variation in one of the first pilot pressure and the second pilot pressure on the other of the first pilot pressure and the second pilot pressure can be made small effectively by the technique of cancelling the second pilot pressure force by the opposing pressure force. Further, the servo pressure can be accurately adjusted only by the first pilot pressure in the normal state. Accordingly, the system of the first embodiment has a considerably high degree of utility.

REFERENCE SIGNS LIST

10: wheel 12: brake device 14: brake pedal [brake operation member] 16: master cylinder device 20: reservoir [low-pressure source] 22: high-pressure-source device [high-pressure source] 24: regulator [pressure regulator] 26: electromagnetic pressure-increase linear valve [SAR] 28: electromagnetic pressure-decrease linear valve [SLR] 32: pilot pressure adjuster [pressure adjuster] 40: housing 42: first pressurizing piston [pressurizing piston] 44: second pressurizing piston 46: input piston 50: partition portion 52: front-side chamber 54: rear-side chamber 56: main body portion 58: flange portion 62: opening 70: inter-chamber communication passage 72: inter-chamber-communication switching valve [mode switching mechanism] 74: low-pressure-source communication passage 76: low-pressure-source-communication switching valve [mode switching mechanism] 100: housing 102: piston 110: main body portion 120: valve mechanism 122: flange portion 124: low-pressure passage [low-pressure chamber] 128: pilot-pressure introduction passage 130: inter-opposing-chamber communication passage 150: regulator [pressure regulator] 152: pilot-pressure-introduction switching valve [pilot-pressure-introduction switching mechanism] 160: regulator [pressure regulator] 162: first piston 164: second piston R1: first pressurizing chamber [pressurizing chamber] R2: second pressurizing chamber R3: inter-piston chamber R4: input chamber R5: input-chamber opposing chamber R6: reaction-force chamber R8: first pilot chamber R9: second pilot chamber R10: regulated-pressure chamber R11: high-pressure chamber R12: pilot-chamber opposing chamber

The invention claimed is:

1. A pressure regulator configured to regulate a pressure of a working fluid supplied from a high-pressure source and to supply the working fluid whose pressure is regulated, comprising:
   a housing;
   a piston disposed in the housing so as to be movable in an axial direction of the housing;
   a high-pressure chamber that communicates with the high-pressure source;
   a low-pressure chamber that communicates with a low-pressure source;
   a regulated-pressure chamber in which a working fluid to be supplied from the pressure regulator is accommodated, the regulated-pressure chamber being configured such that a pressure of the accommodated working fluid acts on the piston, whereby the piston is biased in a first direction in the axial direction;
   a first pilot chamber defined by a part of the piston and the housing and configured such that a working fluid is introduced thereinto and such that a pressure of the introduced working fluid acts on the piston, whereby the piston is biased in a second direction opposite to the first direction;
   a second pilot chamber defined by another part of the piston and the housing and configured such that a working fluid is introduced thereinto and such that a pressure of the introduced working fluid acts on the piston, whereby the piston is biased in the second direction; and
   a valve mechanism configured such that, by a movement of the piston in the second direction, communication between the regulated-pressure chamber and the high-pressure chamber is permitted while communication between the regulated-pressure chamber and the low-pressure chamber is shut off and such that, by a movement of the piston in the first direction, the communication between the regulated-pressure chamber and the high-pressure chamber is shut off while the communication between the regulated-pressure chamber and the low-pressure chamber is permitted.

2. The pressure regulator according to claim 1, further comprising a pilot-chamber opposing chamber defined by still another part of the piston and the housing and configured such that, when a working fluid having a pressure that is the same as a pressure of the working fluid introduced into the second pilot chamber is introduced into the pilot-chamber opposing chamber, the pressure of the working fluid introduced into the pilot-chamber opposing chamber acts on the piston to thereby bias the piston in the first direction and the biasing with respect to the piston by the pressure of the working fluid in the pilot-chamber opposing chamber in the first direction cancels the biasing with respect to the piston by the pressure of the working fluid in the second pilot chamber in the second direction.

3. The pressure regulator according to claim 1,
   wherein the piston has a main body portion having a cylindrical shape and a flange portion formed around an outer circumference of the main body portion,
   wherein the first pilot chamber is located on a first-direction side of the main body portion, and the second pilot chamber is formed around the outer circumference of the main body portion and is located on a first-direction side of the flange portion,
   wherein the pressure regulator further comprises a pilot-chamber opposing chamber defined by still another part of the piston and the housing and configured such that, when the working fluid having a pressure that is the same as a pressure of the working fluid introduced into the second pilot chamber is introduced into the pilot-chamber opposing chamber, the pressure of the working fluid introduced into the pilot-chamber opposing chamber acts on the piston to thereby bias the piston in the first direction and the biasing with respect to the piston by the pressure of the working fluid in the pilot-chamber opposing chamber in the first direction cancels the biasing with respect to the piston by the pressure of the working fluid in the second pilot chamber in the second direction, and wherein the pilot-chamber opposing chamber is formed around the outer circumference of the main body portion of the piston and is located on a second-direction side of the flange portion, such that the pilot-chamber opposing chamber is opposed to the second pilot chamber with the flange portion interposed therebetween.

4. A hydraulic brake system for a vehicle, comprising:
a brake operation member on which a driver performs a braking operation;
a brake device provided for a wheel of the vehicle so as to generate a braking force;
a high-pressure-source device as the high-pressure source;
the pressure regulator defined in claim 1 configured to regulate the pressure of the working fluid supplied from the high-pressure-source device and to supply the working fluid whose pressure is regulated;
a master cylinder device to which the brake operation member is connected and into which the working fluid supplied from the pressure regulator is introduced, the master cylinder device being configured to pressurize a working fluid depending on a pressure of the introduced working fluid and to supply the pressurized working fluid to the brake device; and
a pressure adjuster configured to adjust the working fluid supplied from the high-pressure-source device to an arbitrary pressure,
wherein the working fluid whose pressure is adjusted by the pressure adjuster is introduced into one of the first pilot chamber and the second pilot chamber of the pressure regulator while a working fluid having a pressure in accordance with a brake operation force applied to the brake operation member or a working fluid supplied form the master cylinder device to the brake device is introduced into the other of the first pilot chamber and the second pilot chamber.

5. The hydraulic brake system according to claim 4, comprising an operation-mode switching mechanism configured to selectively effectuate one of two modes each as an operation mode of the master cylinder device (A) a pressurizing mode depending on a supply pressure of the pressure regulator in which the working fluid to be supplied from the master cylinder device to the brake device is pressurized to a pressure at which the brake device generates a braking force having a magnitude in accordance with the pressure of the working fluid supplied from the pressure regulator and introduced into the master cylinder device and (B) a pressurizing mode depending on the operation force and the supply pressure of the pressure regulator in which the working fluid to be supplied from the master cylinder device to the brake device is pressurized to a pressure at which the brake device generates a braking force that is a sum of: the braking force having a magnitude in accordance with the pressure of the working fluid supplied from the pressure regulator and introduced into the master cylinder device; and a braking force having a magnitude in accordance with the brake operation force applied to the brake operation member,
wherein the master cylinder device has:
a housing; and
(a) a pressurizing piston disposed in the housing and having a main body portion and a flange portion that is formed on an outer circumference of the main body portion and (b) an input piston disposed in the housing so as to be located rearward of the pressurizing piston, the brake operation member being connected to a rear end of the input piston,
wherein the master cylinder device has: a pressurizing chamber which is formed forward of the pressurizing piston and in which the working fluid to be supplied to the brake device is pressurized; an inter-piston chamber formed between the main body portion of the pressurizing piston and the input piston; and an input chamber which is formed rearward of the flange portion of the pressurizing piston and into which the working fluid supplied from the pressure regulator is introduced, and
wherein the pressurizing mode depending on the supply pressure of the pressure regulator is effectuated by prohibiting transmission of the brake operation force from the input piston to the pressurizing piston via the working fluid in the inter-piston chamber while the pressurizing mode depending on the operation force and the supply pressure of the pressure regulator is effectuated by permitting the transmission of the brake operation force from the input piston to the pressurizing piston via the working fluid in the inter-piston chamber.

6. The hydraulic brake system according to claim 5,
wherein the master cylinder device has an input-chamber opposing chamber formed forward of the flange portion of the pressurizing piston so as to be opposed to the input chamber with the flange portion interposed therebetween,
wherein a pressure receiving area of the pressurizing piston on which a pressure of a working fluid in the inter-piston chamber acts and a pressure receiving area of the pressurizing piston on which a pressure of a working fluid in the input-chamber opposing chamber acts are made equal to each other, and
wherein the operation-mode switching mechanism is configured to effectuate the pressurizing mode depending on the supply pressure of the pressure regulator by permitting communication between the inter-piston chamber and the input-chamber opposing chamber and by shutting off communication of the inter-piston chamber and the input-chamber opposing chamber with the low-pressure source and is configured to effectuate the pressurizing mode depending on the operation force and the supply pressure of the pressure regulator by shutting off the communication between the inter-piston chamber and the input-chamber opposing chamber and by permitting communication between the low-pressure source and the input-chamber opposing chamber.

7. The hydraulic brake system according to claim 6,
wherein the operation-mode switching mechanism has an inter-chamber communication passage for permitting the communication between the inter-piston chamber and the input-chamber opposing chamber, an inter-chamber-communication switching valve disposed in the inter-chamber communication passage and configured to switch between: the communication between the inter-piston chamber and the input-chamber opposing chamber by the inter-chamber communication passage; and shutting off of the communication therebetween, a low-pressure-source communication passage for permitting the communication between the input-chamber opposing chamber and the low-pressure source without passing through the inter-chamber-communication switching valve, and a low-pressure-source-communication switching valve disposed in the low-pressure-source communication passage and configured to switch between: the communication between the input-chamber opposing chamber and the low-pressure source; and shutting off of the communication therebetween, wherein the operation-mode switching mechanism is configured to effectuate the pressurizing mode depending on the supply pressure of the pressure regulator by permitting the communication between the inter-piston chamber and the input-chamber opposing chamber by means of the inter-chamber-communication switching valve and by shutting off the communication between the input-chamber opposing chamber and the low-pressure source by means of the low-pressure-source-communication switching valve, and wherein the operation-mode switching mechanism is configured to effectuate the pressurizing mode depending on the operation force and the supply pressure of the pressure regulator by shutting off the communication between the inter-piston chamber and the input-chamber opposing chamber by means of the inter-chamber-communication switching valve and by permitting the communication between the input-chamber opposing chamber and the low-pressure source by means of the low-pressure-source-communication switching valve.

8. The hydraulic brake system according to claim 7, further comprising a pilot-pressure introduction passage provided on one side of the inter-chamber-communication switching valve nearer to the inter-piston chamber for permitting communication between the inter-piston chamber and the other of the first pilot chamber and the second pilot chamber of the pressure regulator, wherein the hydraulic brake system is configured such that the working fluid in the inter-piston chamber is introduced into the other of the first pilot chamber and the second pilot chamber as the working fluid having a pressure in accordance with the brake operation force applied to the brake operation member or in accordance with a pressure of the working fluid to be supplied from the master cylinder device to the brake device.

9. The hydraulic brake system according to claim 8, wherein the piston of the pressure regulator has a main body portion having a cylindrical shape and a flange portion formed around an outer circumference of the main body portion, wherein the first pilot chamber is located on a first-direction side of the main body portion, and the second pilot chamber is formed around the outer circumference of the main body portion and is located on a first-direction side of the flange portion, wherein the pressure regulator has a pilot-chamber opposing chamber defined by still another part of the piston and the housing and configured such that, when the working fluid having a pressure that is the same as a pressure of the working fluid introduced into the second pilot chamber is introduced into the pilot-chamber opposing chamber, the pressure of the working fluid introduced into the pilot-chamber opposing chamber acts on the piston to thereby bias the piston in the first direction and the biasing with respect to the piston by the pressure of the working fluid in the pilot-chamber opposing chamber in the first direction cancels the biasing with respect to the piston by the pressure of the working fluid in the second pilot chamber in the second direction, wherein the pilot-chamber opposing chamber is formed around the outer circumference of the main body portion of the piston and is located on a second-direction side of the flange portion, such that the pilot-chamber opposing chamber is opposed to the second pilot chamber with the flange portion interposed therebetween, and wherein the hydraulic brake system has an inter-opposing-chamber communication passage provided on one side of the low-pressure-source-communication switching valve nearer to the input-chamber opposing chamber for permitting communication between the input-chamber opposing chamber and the pilot-chamber opposing chamber of the pressure regulator.

10. The hydraulic brake system according to claim 8, further comprising a pilot-pressure-introduction switching mechanism configured to switch between: introduction of the working fluid in the inter-piston chamber into the other of the first pilot chamber and the second pilot chamber of the pressure regulator; and prohibition of the introduction, wherein the pilot-pressure-introduction switching mechanism includes a pilot-pressure-introduction switching valve provided in the pilot-pressure introduction passage.

* * * * *